(12) United States Patent
Sako et al.

(10) Patent No.: US 7,369,473 B2
(45) Date of Patent: May 6, 2008

(54) RECORD MEDIUM, RECORDING METHOD FOR RECORD MEDIUM, OUTPUT CONTROLLING METHOD, REPRODUCING APPARATUS, RECORD AND REPRODUCTION CONTROLLING METHOD, RECORDING METHOD, RECORD AND REPRODUCTION METHOD, AND RECORDING AND/OR REPRODUCING METHOD

(75) Inventors: Yoichiro Sako, Tokyo (JP); Tatsuya Inokuchi, Kanagawa (JP); Shunsuke Furukawa, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/591,161

(22) Filed: Nov. 1, 2006

(65) Prior Publication Data

US 2007/0047396 A1    Mar. 1, 2007

Related U.S. Application Data

(62) Division of application No. 10/031,023, filed as application No. PCT/JP01/04105 on May 17, 2001, now Pat. No. 7,149,175.

(30) Foreign Application Priority Data

| May 18, 2000 | (JP) | ............................ P2000-146774 |
| Jun. 29, 2000 | (JP) | ............................ P2000-196897 |

(51) Int. Cl.
*G11B 5/09* (2006.01)

(52) U.S. Cl. ................. 369/53.2; 369/53.45; 369/47.1; 369/30.04

(58) Field of Classification Search ..................... None
See application file for complete search history.

(56) References Cited

U.S. PATENT DOCUMENTS 6,526,019 B2    2/2003  Yoshimoto et al.

FOREIGN PATENT DOCUMENTS

EP    1001624    5/2000

*Primary Examiner*—Muhammad Edun
(74) *Attorney, Agent, or Firm*—Lerner, David, Littenberg, Krumholz & Mentlik, LLP

(57) ABSTRACT

A recording method for embedding in a record medium many types of management information corresponding to many types of record media as additional information added to content data that is recorded on the record medium, performing a first encoding process for the content data to which the additional information has been embedded, performing a second encoding process for the many types of management information; and modulating the content data of which the first encoding process has been performed and the many types of management information of which the second encode process has been performed.

45 Claims, 20 Drawing Sheets

SCMS 0 0 : COPY FREE
0 1 : ONE GENERARION COPY PERMITTED
1 0 : RESERVED
1 1 : COPY PROHIBITED

FOR PRE-PRESS (ROM)   FOR RECORDED (R/RW)

SCMS-P   SCMS-R 0 0 : COPY FREE
0 1 : ONE GENERATION COPY PERMITTED
1 0 : RESERVED
1 1 : COPY PROHIBITED

*Fig. 9*

| b0 | b1 | b2 | b3 | |
|----|----|----|----|---|
| 0 | 0 | 0 | 0 | ORIGINAL IS PRE-PRESS. COPY FREE. |
| 0 | 1 | 1 | 1 | ORIGINAL IS PRE-PRESS. ONE GENERATION COPY OF ORIGINAL PERMITTED. |
| 1 | 1 | 1 | 0 | ORIGINAL IS PRE-PRESS. COPY OF ORIGINAL PROHIBITED. |
| 1 | 0 | 0 | 0 | ORIGINAL IS RECORDED. COPY FREE. |
| 1 | 0 | 0 | 1 | ORIGINAL IS RECORDED. ONE GENERATION COPY OF ORIGINAL PERMITTED. |
| 1 | 0 | 1 | 1 | ORIGINAL IS RECORDED.COPY PF ORIGINAL PROHIBITED. |

FOR PRE-PRESS(ROM)  FOR RECORDED (R/RW)
FOR ORIGINAL        FOR NON-ORIGINAL 0 0 0 0 : FREE REPRODUCTION
0 1 × × : CHARGED REPRODUCTION
× × : CHARGING CONDITIONS 0 0 : SOLD, ¥ 10 PER SONG
       0 1 : SOLD, ¥ 100 PER SONG
       1 0 : ¥ 1 FOR REPRODUCTION EVERY 30 SECONDS
       1 1 : ¥ 2 REPRODUCTION EVERY 30 SECONDS

Fig. 11

| b0 | b1 | b2 | b3 | b4 | b5 | b6 | b7 | REPRODUCING CONDITIONS FOR PRE-PRESS (ORIGINAL) | REPRODUCING CONDITIONS FOR RECORDED (NON-ORIGINAL) |
|---|---|---|---|---|---|---|---|---|---|
| 0 | 0 | 0 | 0 | 0 | 0 | 0 | 0 | FREE RERPODUCTION | FREE RERPODUCTION |
| 0 | 0 | 0 | 0 | 1 | 0 | 0 | 0 | FREE RERPODUCTION | ¥10 PER SONG |
| 0 | 0 | 0 | 0 | 1 | 0 | 0 | 1 | FREE RERPODUCTION | ¥100 PER SONG |
| 0 | 0 | 0 | 0 | 1 | 0 | 1 | 0 | FREE RERPODUCTION | ¥1 EVERY 30 SECONDS |
| ... | ... | ... | ... | ... | ... | ... | ... | ...... | ...... |
| 1 | 0 | 0 | 0 | 1 | 0 | 0 | 0 | ¥10 PER SONG | ¥10 PER SONG |
| 1 | 0 | 0 | 0 | 1 | 0 | 0 | 1 | ¥10 PER SONG | ¥100 PER SONG |
| 1 | 0 | 0 | 0 | 1 | 0 | 1 | 0 | ¥10 PER SONG | ¥1 EVERY 30 SECONDS |
| 1 | 0 | 0 | 0 | 1 | 1 | 1 | 1 | ¥10 PER SONG | ¥2 EVERY 30 SECONDS |
| 1 | 0 | 0 | 0 | 1 | 1 | 1 | 1 | ¥10 PER SONG | RERPODUCTION PROHIBITED |
| ... | ... | ... | ... | ... | ... | ... | ... | ...... | ...... |

Fig. 12

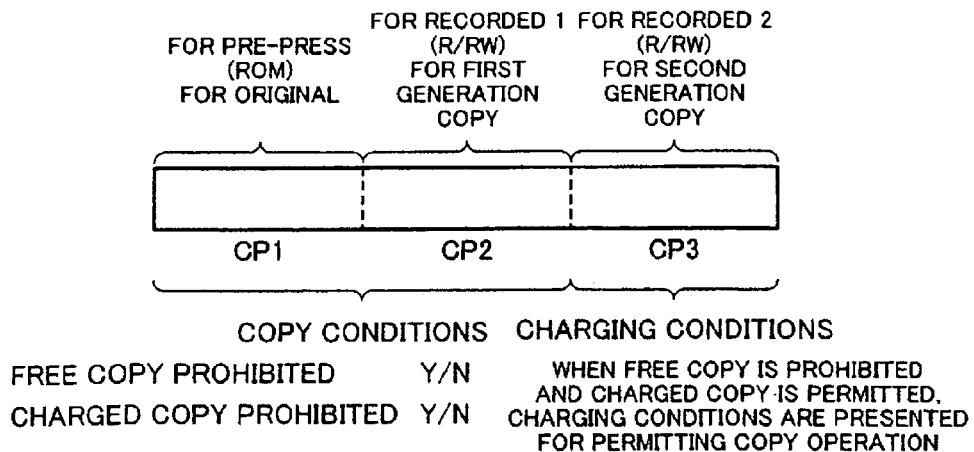

COPY CONDITIONS    CHARGING CONDITIONS
FREE COPY PROHIBITED     Y/N     WHEN FREE COPY IS PROHIBITED
                                 AND CHARGED COPY IS PERMITTED,
CHARGED COPY PROHIBITED  Y/N     CHARGING CONDITIONS ARE PRESENTED
                                 FOR PERMITTING COPY OPERATION

Fig. 13

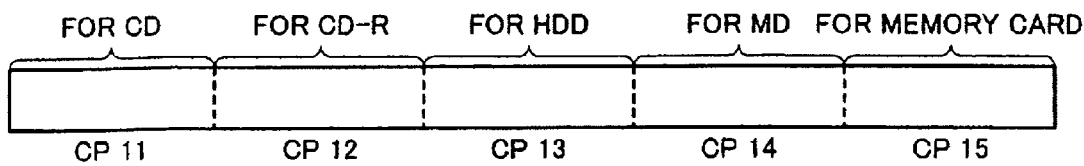

x 0 0 0 : COPY FREE
x 0 0 1 : ONE GENERATION COPY PERMITTED
x 0 1 0 : FIVE COPY PERMITTED
x 0 1 1 : ONE COPY PERMITTED
x 1 1 0 : COPY PROHIBITED, MOVE PERMITTED
x 1 1 1 : COPY PROHIBITED, MOVE PROHIBITED x : REPRODUCTION IDENTIFIER
0 : REPRODUCTION PERMITTED
1 : REPRODUCTION NOT PERMITTED

Fig. 14

| 0001 | 0111 | 1010 | 0111 | 0110 |
|------|------|------|------|------|
| CP 11 | CP 12 | CP 13 | CP 14 | CP 15 |

RECORD MEDIUM, RECORDING METHOD FOR RECORD MEDIUM, OUTPUT CONTROLLING METHOD, REPRODUCING APPARATUS, RECORD AND REPRODUCTION CONTROLLING METHOD, RECORDING METHOD, RECORD AND REPRODUCTION METHOD, AND RECORDING AND/OR REPRODUCING METHOD

CROSS-REFERENCE TO RELATED APPLICATIONS

This application is a divisional of U.S. patent application Ser. No. 10/031,023, filed Jan. 14, 2002, now U.S. Pat. No. 7,149,175 which claims priority to PCT/JP01/04105, filed May 17, 2001, which claims priority to JP2000-196897, filed Jun. 29, 2000, and JP2000-146774, filed May 18, 2000, the disclosures of which are hereby incorporated herein by reference.

TECHNICAL FIELD

The present invention relates to a record medium on which data of a content has been recorded, a recording method for a record medium, an output controlling method, a reproducing apparatus, a record and reproduction controlling method, a recording method, a recording and reproducing method, and a recording and/or reproducing method, in particular, to those for protecting the data of the content.

BACKGROUND ART

To protect the copyright of data of an audio content and a video content that are recorded to a record medium, a watermark of which copy management information as additional information is superimposed and embedded to the data of the contents has been developed. To accomplish such a watermark, a method for spreading a spectrum of additional information using spectrum spreading and superimposing the spread spectrum to data of a content, a method for inserting additional information into a low order bit of a signal or a high order coefficient of compressed data, a method for inserting additional information using masking effect so that the additional information does not affect a content, a method for inserting additional information into a first peak or a second peak of a predetermined range or the vicinity thereof, and so forth are known.

As copy management information for protecting copyright, for a music content, SCMS (Serial Copy Management System) is used. On the other hand, for a video content, CGMS (Copy Generation Management System) is used. The largest difference between the SCMS and the CGMS is in that the former can prohibit an original content from being copied. Thus, a private copy operation can be rejected.

As shown in FIG. 1, using the copy management information of the SCMS composed of two bits, a copy operation is managed. Using the copy management information of the SCMS, not only a copy free designation and a copy prohibition designation, but a copy generation management can be performed.

In other words, as shown in FIG. 1, using the copy management information of the SCMS composed of two bits, copy operations are managed. When the SCMS is (0, 0), it represents that a copy operation can be freely performed. When the SCMS is (0, 1), it represents that a copy operation can be performed in one generation. When the SCMS is (1, 1), it represents that a copy operation is prohibited. In other words, when the SCMS is (0, 1), although an original record medium can be copied, the copied record medium is prohibited from being copied.

As was described above, to protect copyright, a technology of which copy management information is recorded as a watermark has been proposed. As copy management information, the copy management information of the SCMS can be used. Using the copy management information of the SCMS, not only a copy free designation and a copy prohibition designation, but a copy generation management can be performed.

However, when a copy generation management is performed using the SCMS, it is necessary to rewrite the copy management information. For example, when copy management information SCMS of an original record medium is (0, 1), a copy operation can be performed in one generation. Thus, when information of the original record medium is copied to another record medium, it is necessary to rewrite the copy management information SCMS from (0, 1) to (1, 1).

Additional information as a watermark that is superimposed and recorded to data of a content by spectrum spreading or the like. Thus, additional information recorded as a watermark cannot be easily rewritten. Thus, when conventional SCMS as copy management information inserted as a watermark is used, it becomes difficult to manage a copy operation in one generation.

In the copy managing system of the SCMS, if information of an original record medium is directly copied to another record medium, the copy management information of the SCMS is directly copied to the other record medium. For example, when the copy management information SCMS of the original record medium is (0, 1), if information of the original record medium is directly copied to another record medium, the copy management information SCMS of the copied record medium becomes (0, 1). Thus, the copied record medium can be further copied to other record mediums.

Therefore, an object of the present invention is to provide a record medium, a recording method for a record medium, an output controlling method, a reproducing apparatus, a record and reproduction controlling method, a recording method, a recording and reproducing method, and a recording and/or reproducing method that allow a copy operation in a plurality of generations, a reproducing operation, and a charging operation to be easily managed.

DISCLOSURE OF THE INVENTION

The present invention is a record medium for recording a plurality of types of management information provided corresponding to a plurality of types of record mediums along with data of a content.

The present invention is a recording method for a record medium, comprising the steps of:

embedding a plurality of types of management information provided corresponding to a plurality of types of record mediums as additional information to data of a content that is recorded;

performing a first encoding process for the data of the content to which the additional information has been embedded;

performing a second encoding process for the plurality of types of management information; and modulating the data of the content of which the first encode process has been performed and the plurality of types of management information of which the second encode process has been performed.

The present invention is a recording method for a record medium, comprising the steps of:

determining the type of a record medium to which a plurality of types of management information provided corresponding to a plurality of types of record mediums have been recorded along with data of a content; and controlling a recording operation for the data of the content that has been read from the record medium corresponding to the management information selected corresponding to the determined result of the record medium in the plurality of types of management information.

The present invention is an output controlling method, comprising the steps of:

reading data of a content and a plurality of types of management information from a record medium, the plurality of types of management information provided corresponding to a plurality of types of record mediums being embedded to the data of the content, the plurality of types of management information being recoded in a predetermined area of the record medium;

extracting the plurality of types of management information from the data of the content that is read from the record medium;

collating the plurality of types of management information that are extracted with the plurality of types of management information that are read from the record medium; and controlling an output of the data of the content that is read corresponding to the collated result.

The present invention is a reproducing apparatus for a record medium, comprising:

a reading portion for reading data of a content and a plurality of types of management information from the record medium, the plurality of types of management information provided corresponding to a plurality of types of record mediums being embedded to the data of the content, the plurality of types of management information being recoded in a predetermined area of the record medium;

an extracting portion for extracting the plurality of types of management information from the data of the content that is read from the record medium by the reading portion;

a collating portion for collating the plurality of types of management information that are extracted by the extracting portion with the plurality of types of management information that are read from the record medium by the reading portion; and an output controlling portion for controlling an output of the data of the content that is read corresponding to the collated result by the collating portion.

The present invention is a record and reproduction controlling method for a record medium, comprising the steps of:

reading data of a content and a plurality of types of management information from a record medium, the plurality of types of management information provided corresponding to a plurality of types of record mediums being embedded as additional information to the data of the content, the plurality of types of management information being recoded in a predetermined area of the record medium;

extracting the additional information from the data of the content that is read from the record medium;

collating the plurality of types of management information that are contained in the extracted additional information with the plurality of types of management information that are read from the record medium; and controlling an output of the data of the content that is read corresponding to the collated result.

The present invention is a recording method, comprising the steps of:

determining the type of a record medium, a plurality of types of management information provided corresponding to types of record mediums being recorded to the record medium along with data of a content, the plurality of types of management information containing copy management information;

determining whether or not the record medium is an original record medium corresponding to the management information that is read from the record medium and the determined result of the type of the record medium at the first determining step; and when the determined result at the first determining step represents that the record medium is an original record medium, controlling a recording operation for the data of the content that is read from the record medium to another record medium corresponding to the copy management information.

The present invention is a recording method, comprising the steps of:

determining the type of a record medium, a plurality of types of management information provided corresponding to a plurality of types of record mediums being recorded on the record medium, the plurality of types of management information containing identification information, copy generation information, and copy management information;

determining whether or not the record medium is an original record mediums corresponding to the management information that is read from the record medium and the determined result of the type of the record medium at the first determining step; and when the determined result at the second determining step represents that the record medium is an original record medium, advancing the generation of the copy generation information by one and controlling a recording operation for recording the data of the content that is read the record medium to another record medium corresponding to the copy management information.

The present invention is a recording and reproducing method, comprising the steps of:

determining the type of a record medium, a plurality of types of management information provided corresponding to a plurality of types of record mediums being recorded on the record medium, the plurality of types of management information containing copy generation information and copy management information;

determining whether or not the record medium is an original record mediums corresponding to the management information that is read from the record medium and the determined result of the type of the record medium at the first determining step;

when the determined result at the second determining step represents that the record medium is an original record medium, reproducing the record medium corresponding to the management information; and advancing the generation of the copy generation information by one and controlling a recording operation for recording the data of the content that is read from the record medium to another record medium corresponding to the copy management information.

The present invention is a recording method, comprising the steps of:

identifying the type of a record medium, the record medium having an identification portion used to identify the type of the record medium, at least first management information for reproduction-only record medium and second management information for recordable record mediums being recorded to the record medium along with data of a content; and controlling a recording operation for recording the data of the content that is read from the record medium along with the first management information and the second management information to another record medium corresponding to the first management information, when the determined result of the type of the record medium at the determining step represents that the record medium is a reproduction-only record medium, and a recording operation for recoding the data of the content that is read from the record medium along with the first management information and the second management information to the other record medium corresponding to the second management information, when the determined result of the type of the record medium at the determining step represents that the record medium is a recordable record medium.

The present invention is a recording and/or reproducing method, comprising the steps of:

determining the type of a record medium, the record medium having an identification portion used to identify the type thereof, management information containing at least identification information, copy generation information, and copy management information being recoded to the record medium along with data of a content;

determining whether or not the record medium is an original record medium corresponding to the identified result of the record medium and at least the identification information and the copy generation information that are read from the record medium; and controlling a recording operation and/or a reproducing operation for the record medium corresponding to the determined result at the second determining step.

The present invention is a record medium having an identification portion used to identify the type thereof, data of a content being recorded to the record medium, a plurality of management information provided corresponding to a plurality of types of record mediums being embedded as additional information to the data of the content, the plurality of types of management information being recorded in a predetermined area of the record medium.

Copy management information SCMS-P for read-only record mediums and copy management information SCMS-R for recordable record mediums are pre-recorded to a record medium at a time. When the record medium that is reproduced is a read-only record medium, a copy operation is controlled corresponding to the copy management information SCMS-P for read-only record mediums. In contrast, when the record medium that is reproduced is a recordable record medium, a copy operation is controlled corresponding to the copy management information SCMS-R for recordable record mediums.

Data of many contents is distributed with read-only record mediums such as CD and CD-ROM. A copy operation that results in a problem from a view point of copyright protection is a copy operation from a read-only record medium such as CD or CD-ROM to a recordable record medium such as CD-R or CD-RW.

Thus, when an original record medium is a read-only record medium, (0, 0) is written as copy management information SCMS-P for read-only record mediums, and (1, 1) is written as copy management information SCMS-R for recordable record mediums, since copy management information SCMS-P for read-only record mediums is (0, 1), the original record medium can be copied to a recordable record medium as a first generation copy. As to a second generation copy, the recordable record medium is copied to another recordable record medium. In this case, since the copy management information SCMS-R is (1, 1), it represents that a copy operation is prohibited, the copy operation is prohibited. In such a manner, a copy free designation, a one generation copy designation, and a copy prohibition designation can be performed. In addition, when the one generation copy designation is performed, it is not necessary to rewrite the copy management information.

In addition, when original type information recorded on the record medium is different from the type of the real record medium and thereby it is determined that the record medium has been copied, since it can be assumed that a copy operation has been performed in at least one generation, a copy operation is managed supposing that copy management information of which the copy generation is advanced by one is new copy management information. Thus, without need to rewrite the copy management information, a copy generation can be managed.

Thus, assuming that whenever a copy operation is performed, copy management information and copy generation information are rewritten corresponding to a predetermined rule, the original type information recorded on the record medium is different from the type of the real record medium. When it has been determined that the record medium is a copied record medium, the copy management information and the copy generation information are forcedly rewritten corresponding to the predetermined rule. Thus, copied record mediums that do not comply with the predetermined rule are not distributed. Thus, the copyright can be protected.

BRIEF DESCRIPTION OF DRAWINGS

FIG. 9 is a schematic diagram for explaining copy management information; FIG. 11 is a schematic diagram for explaining reproduction management information; FIG. 12 is a schematic diagram for explaining an example of a management for a plurality of generations; FIG. 13 is a schematic diagram for explaining an example of a management for a plurality of devices; FIG. 14 is a schematic diagram for explaining an example of a management for a plurality of devices.

BEST MODES FOR CARRYING OUT THE INVENTION

Next, with reference to the accompanying drawings, embodiments of the present invention will be described. According to a first embodiment of the present invention, a plurality of types of copy management information are provided corresponding to types of record mediums. The plurality of types of copy management information corresponding to types of record mediums are recorded on one record medium at a time. Using the plurality of types of copy management information corresponding to types of record mediums, a copy operation is controlled.

As record mediums, read-only record mediums such as CD (Compact Disc) format optical discs and CD-ROM (Compact Disc Read Only Memory) format optical discs and recordable record mediums such as CD-R (Compact Disc Recordable) format discs and CD-RW (Compact Disc Rewritable) format discs are used. Corresponding to these types of record mediums, copy management information SCMS-P for read-only record mediums such as CD and CD-ROM and copy management information SCMS-R for recordable record mediums such as CD-R and CD-RW are provided.

Record mediums such as CD and CD-ROM can be treated as reproduction-only record mediums because pits are formed by injection molding. In contrast, record mediums such as CD-R and CD-RW can be treated as recordable record mediums because data is optically recorded by an optical pickup.

The copy management information SCMS-P and copy management information SCMS-R can be recorded in the following methods.

(1) as additional information as a watermark, superimposed by spectrum spreading, inserted into a low order bit, inserted into a high order coefficient of compressed data of a content, inserted using masking effect so that it does not exist in a content, or inserted into a first peak or a second peak in a predetermined range or the vicinity thereof.

(2) recorded in a predetermined data area such as a sub code or a header.

(3) recorded in a predetermined physical area of a record medium such as a lead-in area or an area in which so-called TOC data is recorded.

The copy management information SCMS-P and copy management information SCMS-R may be recorded by one of the methods (1) to (3). Alternatively, they may be recorded by all the methods (1) to (3). Further alternatively, they may be recorded by some of the methods (1) to (3).

Record mediums such as CD and CD-ROM that are distributed and sold are quantitatively produced by using stampers created based on a master disc. The master disc and CD and CD-ROM are produced by known methods.

Figure 1:
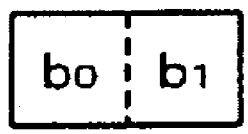
FIG. 1 is a schematic diagram for explaining conventional copy management information.
Figure 2:
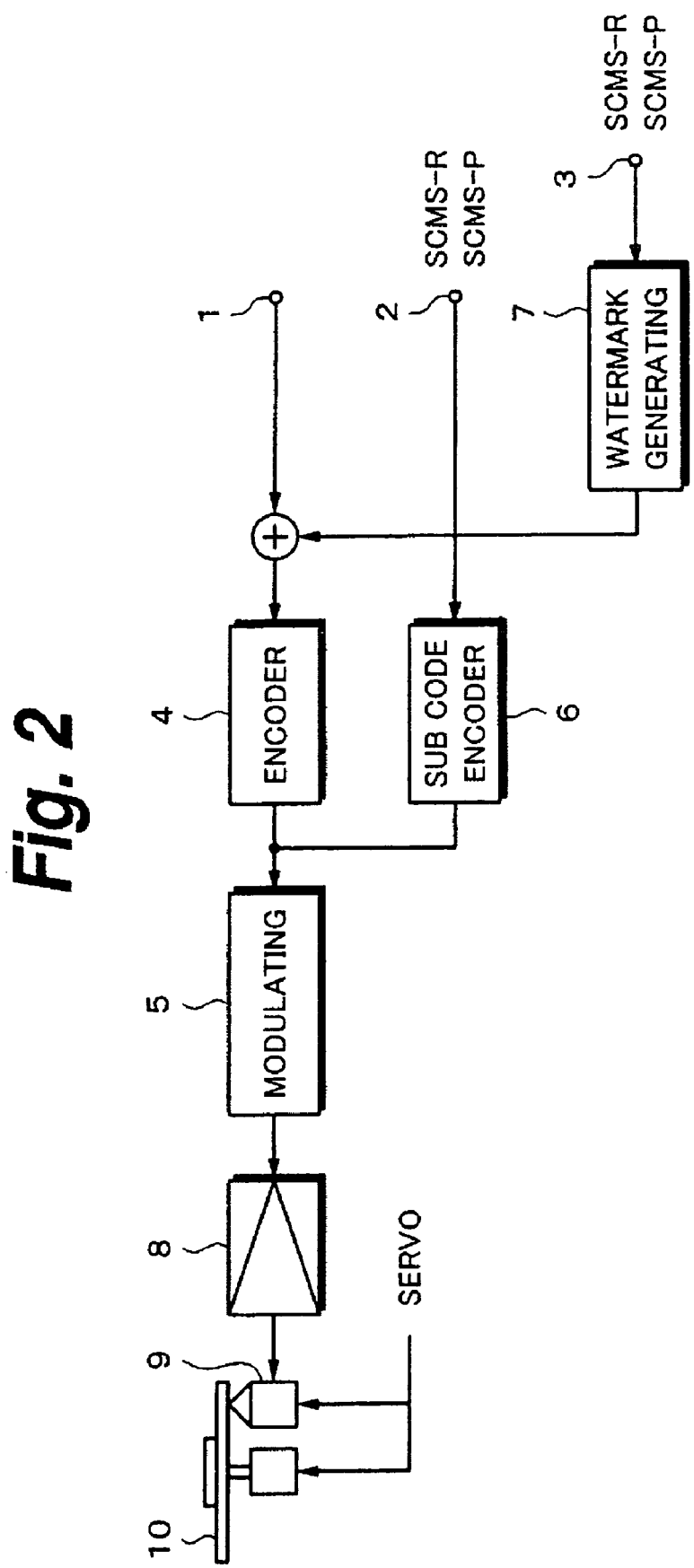
FIG. 2 is a block diagram showing an example of the structure of a recording apparatus according to the present invention.

FIG. 2 shows the structure of a recording apparatus in the case that a master disc is produced. As shown in FIG. 2, when a master disc is produced, data of a content is supplied to an input terminal 1. The copy management information SCMS-P and the copy management information SCMS-R are supplied to input terminals 2 and 3, respectively. The data of the content that is input to the input terminal 1 is supplied to an encoder 4. The encoder 4 encodes the data of the content with error correction code.

The copy management information SCMS-P and the copy management information SCMS-R that are input from the input terminal 3 are supplied to a watermark generating circuit 7. The watermark generating circuit 7 places the copy management information SCMS-P and the copy management information SCMS-R in additional information as a watermark. An output of the watermark generating circuit 7 is superimposed with the data of the content that is input from the input terminal 1.

The copy management information SCMS-P and the copy management information SCMS-R that are input to the input terminal 2 are supplied to a sub code encoder 6. The sub code encoder 6 places the copy management information SCMS-P and the copy management information SCMS-R in the sub code data. The resultant sub code data is supplied to a modulating circuit 5.

An output of the modulating circuit 5 is supplied to an optical pickup 9 through an RF amplifier 8. The optical pickup 9 records the data of the content to a master disc 10 as a record medium. The information of the watermark containing the copy management information SCMS-P and the copy management information SCMS-R is superimposed with the data recorded on the master disc 10. The sub code data contains the copy management information SCMS-P and the copy management information SCMS-R.

Discs that are sold and distributed are quantitatively produced by stampers produced based on the master disc 10 produced in the above-described manner.

The two copy management information SCMS-P and copy management information SCMS-R are recorded on one record medium at a time. When the record medium is reproduced, one of the two copy management information SCMS-P and copy management information SCMS-R is selected corresponding to the type of the record medium. Corresponding to the selected copy management information, a copy operation is controlled.

Figure 8:
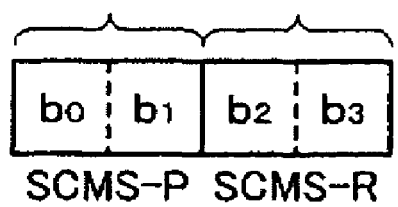
FIG. 8 is a schematic diagram for explaining copy management information.

As shown in FIG. 8, the copy management information SCMS-P and the copy management information SCMS-R manage a copy operation using information of two bits each as with the SCMS copy management information. In each of the copy management information SCMS-P and the copy management information SCMS-R, (0, 0) represents copy free; (0, 1) represents one generation copy permitted; and (1, 1) represents copy prohibited.

Data of many contents is distributed with read-only record mediums such as CD and CD-ROM. A copy operation that results in a problem from a view point of copyright protection is a copy operation from a read-only record medium such as CD or CD-ROM to a recordable record medium such as CD-R or CD-RW.

According to the first embodiment of the present invention, data of an original content is distributed with read-only record mediums. A copy operation that results in a problem from a view point of copyright protection is a copy operation from a read-only record medium to a recordable record medium. According to the embodiment, the fact that the type of a record medium on which data of an original content has been recorded is different from the type of a record medium on which the data is copied is considered.

Figure 3:
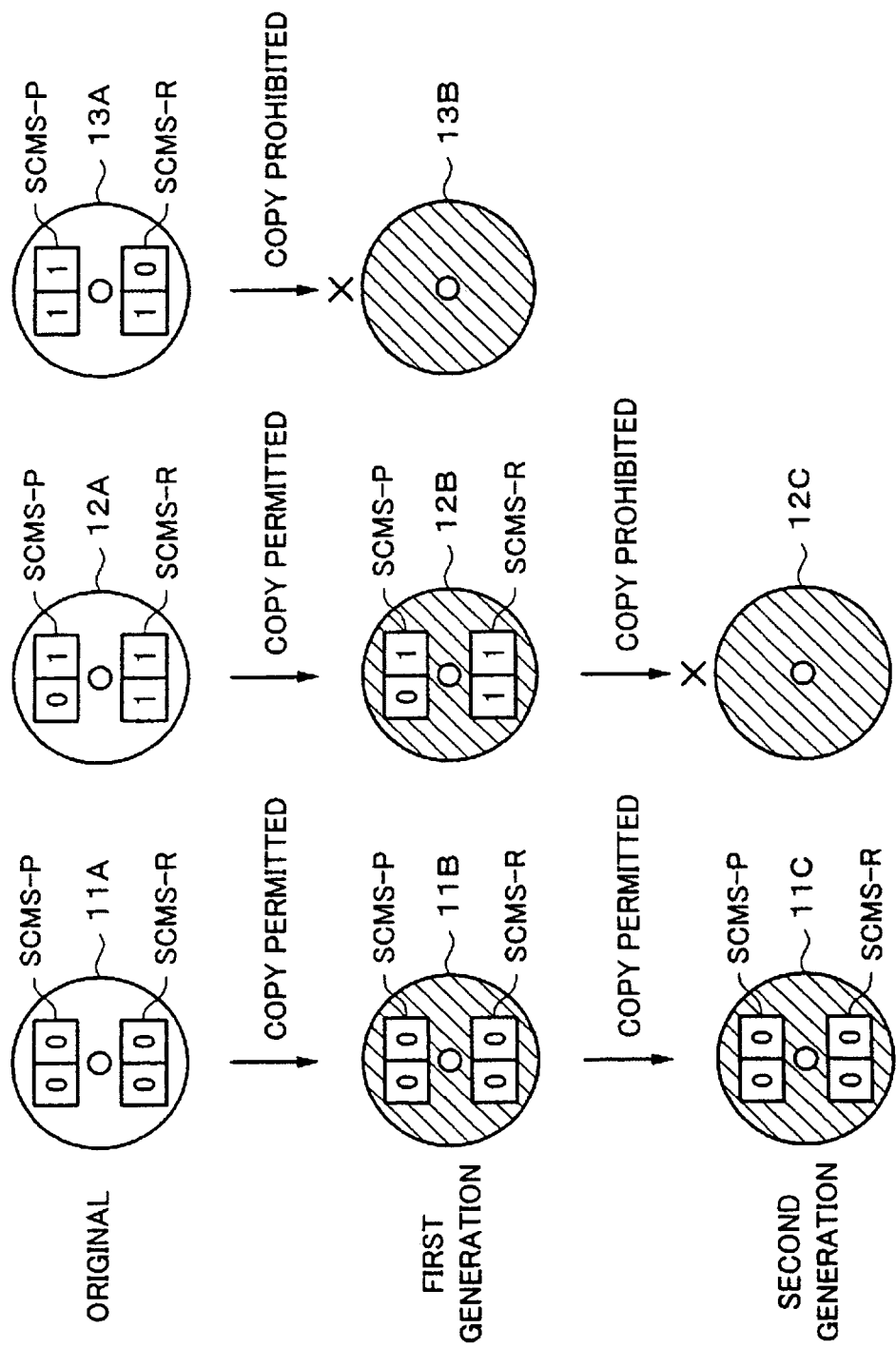
FIG. 3 is a schematic diagram for explaining a copy control using a record medium according to the present invention.

FIG. 3 shows a copy control in the case that data of a content is copied using two types of copy management information that are the copy management information SCMS-P for read-only record mediums and the copy management information SCMS-R for recordable record mediums. In FIG. 3, record mediums that are not hatched are read-only record mediums, whereas record mediums that are hatched are writable record mediums.

In FIG. 3, the case of which an original record medium 11A is copied will be described. The original record medium 11A is a read-only record medium such as CD or CD-ROM. On the original record medium 11A, which is a read-only record medium, (0, 0) and (0, 0) are written as the copy management information SCMS-P for read-only record mediums and copy management information SCMS-R for recordable record mediums, respectively.

Now, it is assumed that information of the original record medium 11A is copied to a record medium 11B and a first generation copy of the original record medium 11A is produced. The record medium 11B is a recordable record medium such as CD-R or CD-RW.

When information is copied from the record medium 11A to the record medium 11B, the record medium 11A is reproduced and the copy management information of the original record medium 11A is checked. As the copy management information, there are two types of copy management information that are the copy management information SCMS-P for read-only record mediums and the copy management information SCMS-R for recordable record mediums. However, since the original record medium 11A is a read-only record medium, the copy management information SCMS-P for read-only record mediums is checked. Since the copy management information SCMS-P for read-only record mediums is (0, 0), it represents that a copy operation is permitted. Thus, information can be copied from the record medium 11A to the record medium 11B. As a result, the information of the record medium 11A is copied to the record medium 11B. A first generation copy of the original record medium 11A is produced on the record medium 11B.

The copy management information SCMS-P for read-only record mediums and the copy management information SCMS-R for writable record mediums that have been recorded on the original record medium 11A are recorded as they are to the record medium 11B as the first generation copy. Thus, (0, 0) and (0, 0) as the copy management information SCMS-P for read-only record mediums and the copy management information SCMS-R for recordable record mediums, respectively, are written to the record medium 11B as the first generation copy.

In addition, it is assumed that information of the record medium 11B is copied to a record medium 11C so as to produce a second generation copy of the record medium 11A. The record medium 11C is a recordable record medium such as CD-R or CD-RW.

When information is copied from the record medium 11B to the record medium 11C, the record medium 11B is reproduced. At that point, the copy management information of the record medium 11B is checked. Since the record medium 11B is a recordable record medium, the copy management information SCMS-R for recordable record mediums is checked. Since the copy management information SCMS-R for recordable record mediums is (0, 0), a copy operation is permitted. Thus, information can be copied from the record medium 11B to the record medium 11C. As a result, information of the record medium 11B is copied to the record medium 11C. A second generation copy of the original record medium 11A is produced on the record medium 11C.

The copy management information SCMS-P for read-only record mediums and the copy management information SCMS-R for recordable record mediums that have been recorded on the record medium 11B are recorded as they are to the record medium 11C as the second generation copy. Thus, (0, 0) and (0, 0) as the copy management information SCMS-P for read-only record mediums and the copy management information SCMS-R for recordable record mediums, respectively, are written to the record medium 11C as the second generation copy, respectively.

In such a manner, when (0, 0) and (0, 0) as the copy management information SCMS-P for read-only record mediums and the copy management information SCMS-R for recordable record mediums, respectively, have been written to the original record medium 11A, a copy operation can be freely permitted in a plurality of generations.

Next, the case of which an original record medium 12A is copied will be described. The original record medium 12A is a read-only record medium such as CD or CD-ROM. On the original record medium 12A, (0, 1) and (1, 1) as the copy management information SCMS-P for read-only record mediums and the copy management information SCMS-R for recordable record mediums, respectively, have been written. It is assumed that information of the record medium 12A is copied to a record medium 12B so as to produce a first generation copy of the record medium 12A. The record medium 12B is a recordable record medium such as CD-R or CD-RW.

When information is copied from the record medium 12A to the record medium 12B, the record medium 12A is reproduced. At that point, the copy management information is checked. Since the original record medium 12A is a read-only record medium, the copy management information SCMS-P for read-only record mediums is checked. Since the copy management information SCMS-P for read-only record mediums is (0, 1), a copy operation is performed in one generation. Thus, the information of the record medium 12A is copied to the record medium 12B. As a result, the information of the original record medium 12A is copied to the record medium 12B. A first generation copy of the original record medium 12A is produced on the record medium 12B.

The copy management information SCMS-P for read-only record mediums and the copy management information SCMS-R for recordable record mediums that have been recorded on the original record medium 12A are recorded as they are to the record medium 12B as a first generation copy. Thus, (0, 1) and (1, 1) as the copy management information SCMS-P for read-only record mediums and the copy management information SCMS-R for recordable record mediums, respectively, are written to the record medium 12B as the first generation copy.

Further, it is assumed that information of the record medium 12B is copied to a record medium 12C so as to produce a second generation copy of the record medium 12A. The record medium 12C is a recordable record medium such as CD-R or CD-RW.

When information is copied from the record medium 12B to the record medium 12C, the record medium 12B is reproduced. At that point, the copy management information is checked. Since the record medium 12B is a recordable record medium, the copy management information SCMS-R for recordable record mediums is checked. Since the copy management information SCMS-R for recordable record medium is (1, 1), a copy operation is prohibited. Thus, the information of the record medium 11B cannot be copied to the record medium 11C.

In such a manner, when (0, 1) and (1, 1) as the copy management information SCMS-P for read-only record mediums and the copy management information SCMS-R for recordable record mediums, respectively, have been written to the original record medium 12A, a copy operation is permitted in only one generation.

Next, the case of which an original record medium 13A is copied will be described. The original record medium 13A is a read-only record medium such as CD or CD-ROM. (1, 1) as the copy management information SCMS-P for read-only record mediums has been written to the original record medium 13A. In addition, since the original record medium 13A is prohibited from being copied, it is impossible to copy the information of the record medium 13A to a recordable record medium. Thus, (1, 0) as the copy management information SCMS-R for recordable record mediums has been written to the record medium 13A. In this case, it is assumed that the information of the record medium 13A is copied to a record medium 13B so as to produce a first generation copy of the record medium 13A. The record medium 13B is a recordable record medium such as CD-R or CD-RW.

When information is copied from the original record medium 13A to the record medium 13B, the original record medium 13A is reproduced. At that point, the copy management information is checked. Since the original record medium 13A is a read-only record medium, the copy management information SCMS-P for read-only record mediums is checked. Since the copy management information SCMS-P for read-only record mediums is (1, 1), a copy operation is prohibited. Thus, information cannot be copied from the record medium 13A to the record medium 13B.

In such a manner, when (1, 1) and (1, 0) as the copy management information SCMS-P for read-only record mediums and the copy management information SCMS-R for recordable record mediums, respectively, have been written to the original record medium 13A, a copy operation is prohibited.

As was described above, both the copy management information SCMS-P for read-only record mediums and the copy management information SCMS-R for recordable record mediums have been recorded to a record medium. When a record medium to be reproduced is a read-only record medium, a copy operation is controlled corresponding to the copy management information SCMS-P for read-only record mediums. When a record medium to be reproduced is a recordable record medium, a copy operation is controlled corresponding to the copy management information SCMS-R for recordable record mediums.

In this case, as shown in FIG. 3, a copy free designation, a one generation copy designation, and a copy prohibition designation can be performed. When a one copy generation designation is performed, it is not necessary to rewrite the copy management information. Thus, when the copy management information is recorded to additional information as a watermark, it is not necessary to rewrite the watermark.

Figure 4:
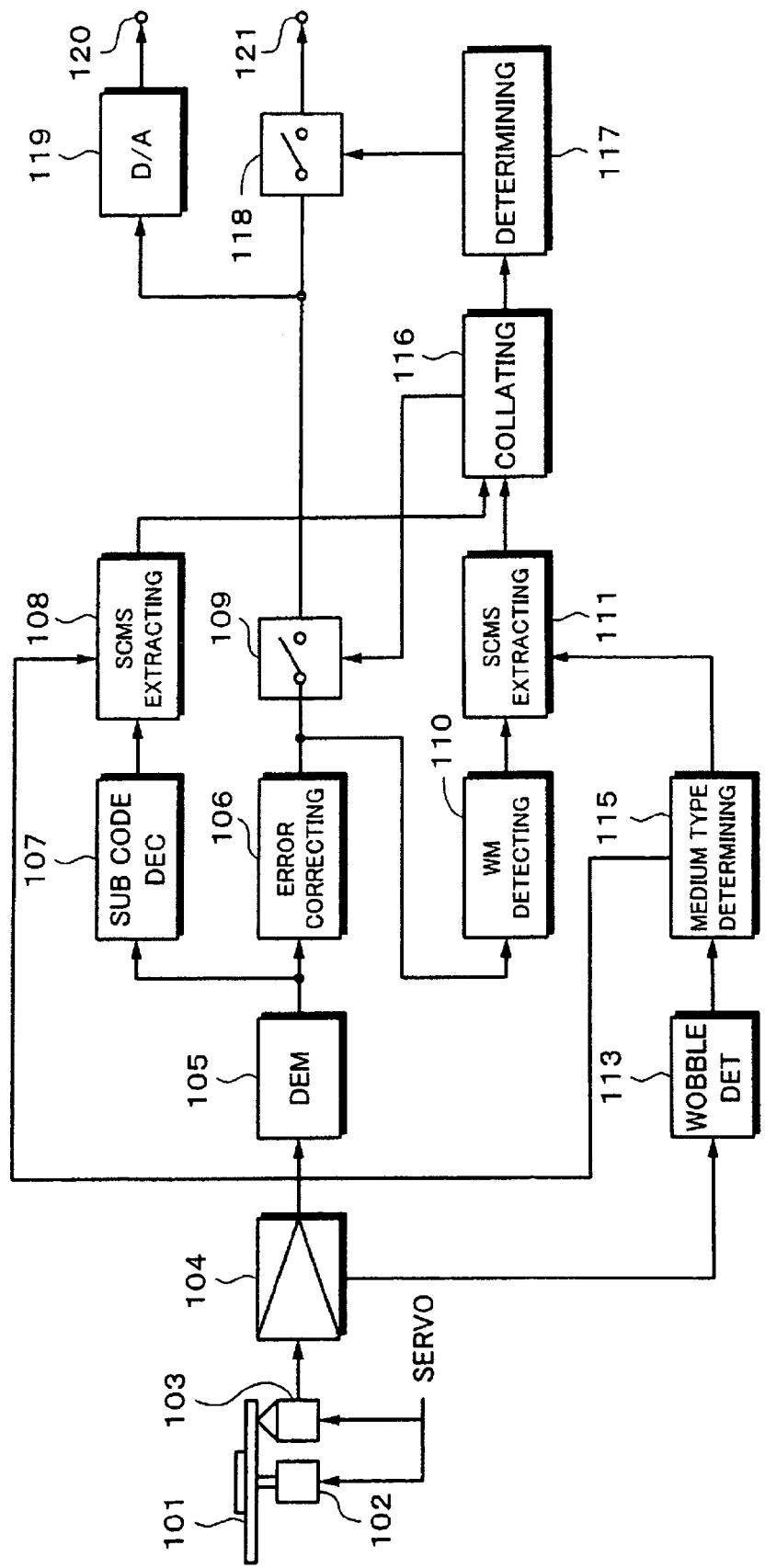
FIG. 4 is a block diagram showing an example of the structure of a reproducing apparatus according to the present invention.

FIG. 4 shows an example of a data reproducing apparatus that controls a copy operation for a record medium using such two types of copy management information.

In FIG. 4, an optical disc 101 is rotated and driven by a spindle motor 102. An optical pickup 103 that reproduces data from the optical disc 101 is disposed. A feed motor (not shown) that travels the optical pickup 103 in the radius direction of the disc is disposed. A servo circuit that controls the rotation of the spindle motor 102 and a servo circuit that controls focusing and tracking of the optical pickup are disposed.

Additional information as a watermark is superimposed to data of a content recorded on the optical disc 101. A watermark is accomplished by a method for inserting additional information using spectrum spreading, a method for inserting additional information to a low order bit of a signal or a high order coefficient of compressed data, a method for inserting additional information using masking effect, and so forth. Additional information as a watermark contains copy management information composed of copy management information SCMS-P for read-only record mediums and copy management information SCMS-R for recordable record mediums.

In addition to data of a content, data of sub code can be recorded on the optical disc 101. The data of the sub code contains copy management information composed of copy management information SCMS-P for read-only record mediums and copy management information SCMS-R for recordable record mediums. The copy management information recorded as additional information as a watermark is the same as the copy management information contained in the data of the sub code.

The optical disc 101 is a reproduction-only optical disc (for example, CD, CD-ROM, or CD2-ROM) or a recordable optical disc (for example, CD-R, CD-RW, CD2-R, or CD2-RW). When the optical disc 101 is a reproduction-only optical disc, it contains wobble information of which pits are wobbled in the track direction.

A reproduction signal that is read from the optical disc 101 is supplied from the optical pickup 103 to a reproducing amplifier 104. An output signal of the reproducing amplifier 104 is supplied to a demodulating circuit 105. The demodulating circuit 105 performs a demodulating process for data of an output signal supplied from the reproducing amplifier 104. Output data of the demodulating circuit 105 is supplied to an error correcting circuit 106. In addition, the output signal of the demodulating circuit 105 is supplied to a sub code decoder 107.

An output signal of the reproducing amplifier 104 is supplied to a wobble detecting circuit 113. An output of the wobble detecting circuit 113 is supplied to a medium type determining circuit 115. The medium type determining circuit 115 determines the type of the optical disc 101 that is reproduced corresponding to an output of the wobble detecting circuit 113.

In other words, the wobble detecting circuit 113 detects wobble information of which pits are wobbled and recorded in a perpendicular direction of the track direction of the optical disc 101. Depending on whether the wobble detecting circuit 113 can detect the wobble information, the medium type determining circuit 115 determines whether the optical disc 101 is a reproduction-only disc or a recordable disc. When the wobble detecting circuit 113 has detected the wobble information, the medium type determining circuit 115 determines that the optical disc 101 is a reproduction-only disc. In contrast, when the wobble detecting circuit 113 has not detected the wobble information, the medium type determining circuit 115 determines that the optical disc 101 is a recordable disc.

An error correcting circuit 106 performs an error correcting process for output data of the demodulating circuit 105. An output of the error correcting circuit 106 is supplied to a switch circuit 109. In addition, the output of the error correcting circuit 106 is supplied to a watermark detecting circuit 110. Output data of the error correcting circuit 106 through the switch circuit 109 is output from a data output terminal 121 through the switch circuit 118. In addition, the output data of the data output terminal 121 is supplied to a D/A converter 119. An output of the D/A converter 119 is obtained from an analog signal output terminal 120.

Data of a content that is read or reproduced from the optical disc 101 has been superimposed with additional information as a watermark. An output of the error correcting circuit 106 is supplied to the watermark detecting circuit 110. The watermark detecting circuit 110 detects additional information as a watermark superimposed in the data of the content. The additional information as the watermark that has been detected is supplied to a copy management information extracting circuit 111.

The data reproduced from the optical disc 101 contains the data of the sub code. The data of the sub code contains copy management information SCMS-P and SCMS-R. An output of the demodulating circuit 105 is supplied to the sub code decoder 107. The sub code decoder 107 decodes the data of the sub code. An output of the sub code decoder 107 is supplied to a copy management information extracting circuit 108.

A medium type determination signal is supplied from the medium type determining circuit 115 to the copy management information extracting circuit 111 and the copy management information extracting circuit 108. As was described above, the medium type determining circuit 115 determines whether the optical disc 101 is a read-only disc or a recordable disc depending on whether a wobble signal is present or absent. The medium type determining circuit 115 outputs the medium type determination signal corresponding to the determined record medium type.

The copy management information extracting circuit 111 selects the copy management information corresponding to the determined record medium type from the copy management information SCMS-P and SCMS-R corresponding to the medium type determination signal received from the medium type determining circuit 115. In other words, when the medium type determining circuit 115 has determined that the optical disc 101 is a read-only disc, the copy management information extracting circuit 111 outputs the copy management information SCMS-P for read-only record mediums as the copy management information contained in the additional information as the watermark. In contrast, when the medium type determining circuit 115 has determined that the optical disc 101 is a recordable disc, the copy management information extracting circuit 111 outputs the copy management information SCMS-R for recordable record mediums as the copy management information contained in the additional information as the watermark.

The copy management information extracting circuit 108 selects the copy management information corresponding to the record medium from the copy management information SCMS-P and SCMS-R contained in the data of the sub code corresponding to the output of the medium type determining circuit 115. In other words, when the medium type determining circuit 115 has determined that the optical disc 101 is a read-only disc, the copy management information extracting circuit 108 outputs the copy management information SCMS-P for read-only record mediums as the copy management information contained in the data of the sub code. In contrast, when the medium type determining circuit 115 has determined that the optical disc 101 is a recordable disc, the copy management information extracting circuit 108 outputs the copy management information SCMS-R for recordable record mediums as the copy management information contained in the data of the sub code.

An output of the copy management information extracting circuit 111 and an output of the copy management information extracting circuit 108 are supplied to a collating circuit 116. The collating circuit 116 collates the copy management information SCMS-P or SCMS-R contained in the sub code extracted by the copy management information extracting circuit 108 with the copy management information SCMS-P or SCMS-R contained in the information as the watermark extracted by the copy management information extracting circuit 111.

Since the copy management information SCMS-P and SCMS-R contained in the sub code are normally the same as the copy management information SCMS-P and SCMS-R contained in the additional information as the watermark, the copy management information SCMS-P or SCMS-R contained in the sub code extracted by the copy management information extracting circuit 108 must be matched with the copy management information SCMS-P or SCMS-R contained in the additional information as the watermark extracted by the copy management information extracting circuit 111. When the collated result of the collating circuit 116 represents that the copy management information contained in the sub code matches the copy management information contained in the additional information as the watermark, the switch circuit 109 is turned on.

An output of the collating circuit 116 is supplied to a determining circuit 117. The determining circuit 117 controls the switch circuit 118 corresponding to the copy management information SCMS-P or SCMS-R.

In other words, when the copy management information SCMS-P or SCMS-R is (0, 0) or (0, 1), since a copy operation is permitted or in only one generation (see FIG. 8), the determining circuit 117 causes the switch circuit 118 to be turned on. In contrast, when the copy management information SCMS-P or SCMS-R is (1, 1), since a copy operation is prohibited, the determining circuit 117 causes the switch circuit 118 to be turned off.

Thus, when the copy management information SCMS-P or SCMS-R contained in the sub code extracted by the copy management information extracting circuit 108 matches the copy management information SCMS-P or SCMS-R contained in the information of the watermark extracted by the copy management information extracting circuit 111, the switch circuit 109 is turned on.

When the copy management information SCMS-P or SCMS-R is selected corresponding to the type of the record medium and the selected copy management information is (0, 0) or (0, 1), the switch circuit 118 is turned on. When the switch circuit 109 is turned on and the switch circuit 118 is turned on, an output of the optical disc 101 that has been decoded by the error correcting circuit 106 is output from the data output terminal 121 through the switch circuit 109 and the switch circuit 118. Thus, when the recording apparatus is connected to the data output terminal 121, data can be copied.

When the copy management information SCMS-R is (1, 1), since a copy operation is prohibited (see FIG. 8), the switch circuit 118 is turned off. When the switch circuit 118 is turned off, an output of the optical disc 101 that has been decoded by the error correcting circuit 106 is not output from the data output terminal 121. Thus, even if the recording apparatus is connected to the data output terminal 121, data cannot be copied.

When the copy management information SCMS-P and SCMS-R have been recorded in the sub code and the watermark on the optical disc 101, corresponding to the copy management information SCMS-P and SCMS-R, the switch circuit 118 is turned on/off so as to prevent an illegal copy operation.

Figure 5:
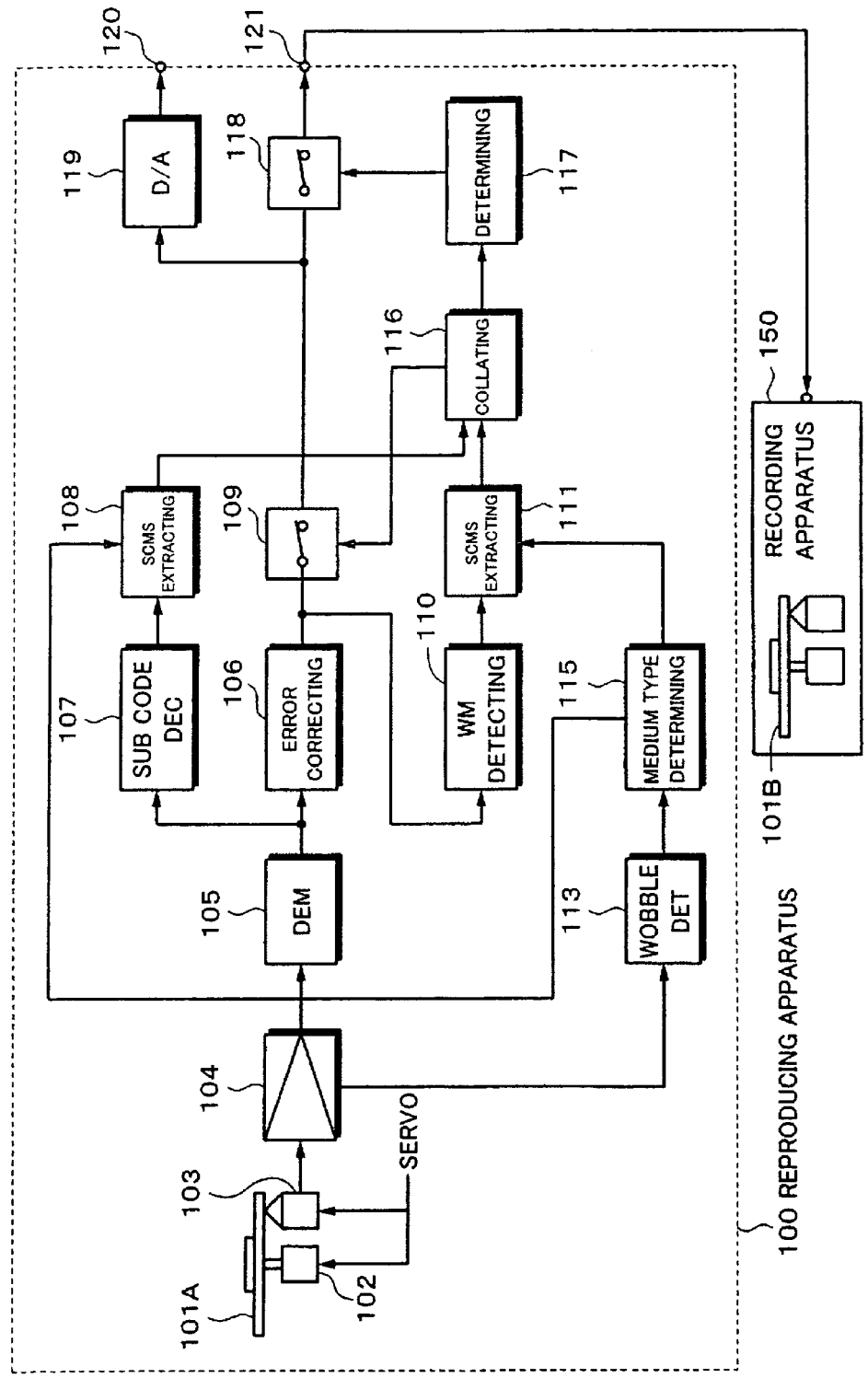
FIG. 5 is a block diagram for explaining the example of the reproducing apparatus according to the present invention.

FIG. 5 explains a disc copy operation attempted in the case that a recording apparatus 150 is connected to the reproducing apparatus 100 shown in FIG. 4.

It is assumed that a read-only optical disc 101A is loaded to the reproducing apparatus 100. Each of sub code and watermark of the optical disc 101A contains (0, 1) and (1, 1) as copy management information SCMS-P for read-only record mediums and copy management information SCMS-R for recordable record mediums.

When the optical disc 101A is reproduced by the reproducing apparatus 100, since wobble information is detected, the medium type determining circuit 115 determines that the optical disc 101A is a read-only disc.

The sub code decoder 107 decodes the copy management information SCMS-P and SCMS-R recorded in the sub code of the reproduction data of the optical disc 101A. The sub code data is supplied to the copy management information extracting circuit 108. Since the medium type determining circuit 115 determines that the optical disc 101 is a read-only disc, the copy management information extracting circuit 108 selects the copy management information SCMS-P for read-only record mediums and outputs it.

The watermark detecting circuit 110 decodes the copy management information SCMS-P and SCMS-R superimposed as a watermark and recorded as additional information in data of a content reproduced from the optical disc 101A. The additional information added as the watermark is supplied to the copy management information extracting circuit 111. Since the optical disc 101A is a read-only disc, the copy management information extracting circuit 111 selects the copy management information SCMS-P.

When the copy management information SCMS-P extracted by the copy management information extracting circuit 108 matches the copy management information SCMS-P extracted by the copy management information extracting circuit 111, the switch circuit 109 is turned on. At that point, corresponding to the copy management information contained in the sub code selected by the copy management information extracting circuit 108 and the copy management information SCMS-P contained in the watermark extracted by the copy management information extracting circuit 111, the switch circuit 118 is controlled. Since both the copy management information contained in the sub code and the copy management information SCMS-P contained in the watermark are (0, 1), an output of the determining circuit 117 causes the switch circuit 118 to be turned on.

Thus, the reproduction information of the optical disc 101A is demodulated by the demodulating circuit 105. Thereafter, an error of the reproduction information is corrected by the error correcting circuit 106. The resultant reproduction information is output from the data output terminal 121 through the switch circuit 109 and the switch circuit 118. The data that is output from the data output terminal 121 is input to an input terminal of the recording apparatus 150. The data is recorded on an optical disc 101B loaded in the recording apparatus 150.

At that point, the same copy management information as the optical disc 101A is recorded to the optical disc 101B. Thus, the copy management information SCMS-P for read-only record mediums and the copy management information SCMS-R for recordable record mediums become (0, 1) and (1, 1), respectively.

Figure 6:
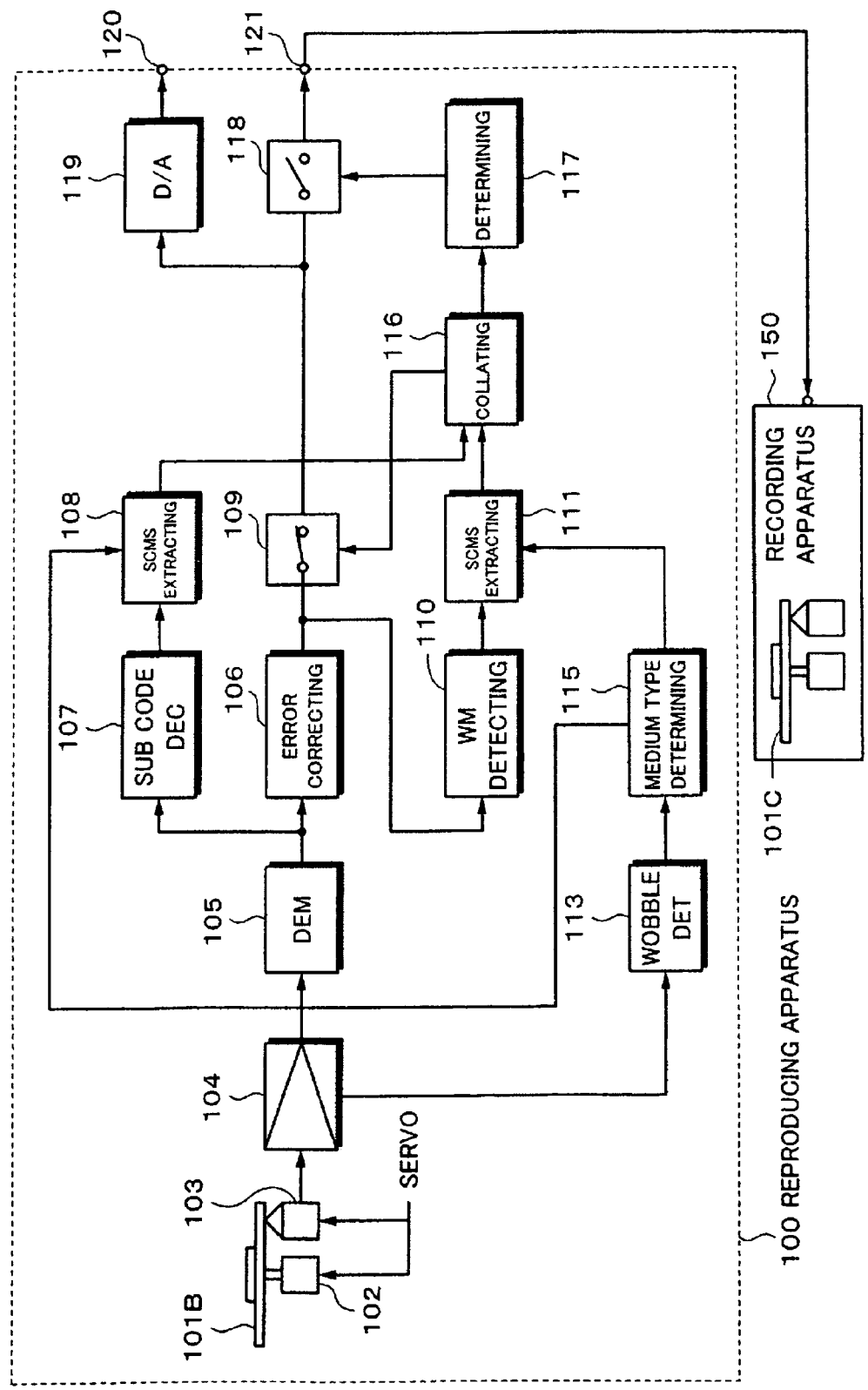
FIG. 6 is a block diagram for explaining the example of the reproducing apparatus according to the present invention.

Next, as shown in FIG. 6, it is assumed that the optical disc 101B of which data of a content of the optical disc 101A has been copied is loaded to the reproducing apparatus 100, that a recordable optical disc 101C is loaded to the recording apparatus 150, and that the optical disc 101B is tried to be copied to the optical disc 101C.

In this case, when the optical disc 101B is reproduced, since the medium type determining circuit 115 does not detect wobble information from the optical disc 101B, the medium type determining circuit 115 determines that the optical disc 101B is a recordable disc.

The sub code decoder 107 decodes the copy management information SCMS-P and SCMS-R recorded in the sub code. Since the optical disc 101B is a recordable disc, the copy management information extracting circuit 108 selects the copy management information SCMS-R and outputs it.

The watermark detecting circuit 110 decodes the copy management information SCMS-P and SCMS-R contained in the watermark. Since the optical disc 101B is a writable disc, the copy management information extracting circuit 111 selects the copy management information SCMS-R and outputs it.

When the copy management information SCMS-R extracted by the copy management information extracting circuit 108 matches the copy management information SCMS-R extracted by the copy management information extracting circuit 111, the switch circuit 109 is turned on. At that point, corresponding to the copy management information contained in the sub code and selected by the copy management information extracting circuit 108 and the copy management information contained in the watermark and extracted by the copy management information extracting circuit 111, the switch circuit 118 is switched. Since both the copy management information SCMS-R contained in the sub code and the copy management information SCMS-R contained in the watermark are (1, 1), corresponding to an output of the determining circuit 117, the switch circuit 118 is turned off.

Thus, no data is output from the data output terminal 121. Thus, output data of the optical disc 101B cannot be recorded to the optical disc 101C loaded in the recording apparatus 150. Thus, when the copy management information for read-only record mediums and the copy management information for recordable record mediums are (0, 1) and (1, 1), respectively, in the original optical disc 101, a copy operation is permitted in only one generation.

In the above-described example, copy management information is recorded in both sub code and watermark. This is because the copy management is enhanced and its reliability is improved.

Of course, copy management information may be recorded to one of sub code and watermark. Alternatively, although copy management information may be recorded to both sub code and watermark, one of them may be used to manage a copy operation.

Further alternatively, copy management information may be recorded to other than sub code and watermark. For example, copy management information may be recorded to a predetermined area of a record medium for example an area for TOC (Table Of Contents) data or a lead-in area. Alternatively, copy management information may be recorded to a sector header.

In the above-described example, it is assumed that an original record medium is a read-only record medium. However, it should be noted that an original record medium is not always a read-only record medium. Instead, an original record medium may be provided as a recordable record medium. For example, the user may distribute a record medium that he or she produced. Alternatively, the user may publish a content at his or her own expense in limited production basis. In such cases, an original record medium is a recordable record medium. In addition, when a downloaded content is original, an original record medium is a recordable record medium.

Figure 7:
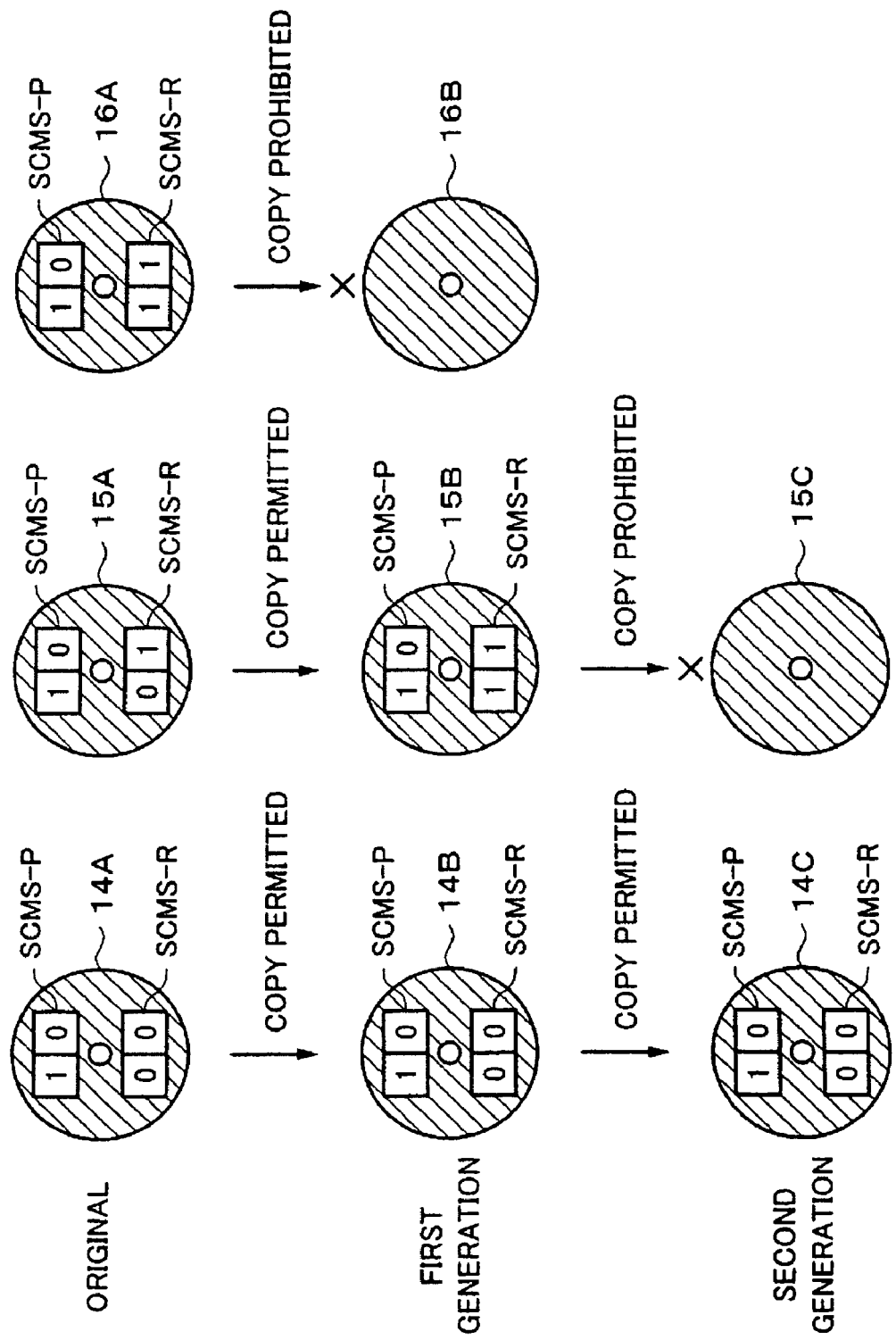
FIG. 7 is a schematic diagram for explaining a copy control using a record medium according to the present invention.

FIG. 7 shows an example of which an original record medium is a recordable record medium. As with the above-described case, when an original record medium is a recordable record medium, two types of copy management information SCMS-P for read-only record mediums and copy management information SCMS-R for recordable record mediums are used. Since it is impossible that information will be copied from a recordable record medium to a read-only record medium, as the copy management information SCMS-P for read-only record mediums, (1, 0) that is reserved in the SCMS is used. When the copy management information SCMS-P for read-only record mediums is (1, 0), an original record medium is a recordable record medium.

In FIG. 7, an original record medium 14A is a recordable record medium. On the original record medium 14A, (1, 0) and (0, 0) as copy management information SCMS-P for read-only record mediums and copy management information SCMS-R for recordable record mediums have been written, respectively. In this case, it is assumed that information of the record medium 11A is copied to a recordable record medium 14B so as to produce a first generation copy of the record medium 14A.

When information is copied from the record medium 14A to the record medium 14B, the record medium 14A is reproduced. At that point, the copy management information is checked. Since the original record medium 14A is a recordable record medium, the copy management information SCMS-R for recordable record mediums is checked. Since the copy management information SCMS-R for recordable record mediums is (0, 0), a copy operation is permitted. Thus, information is copied from the record medium 14A to the record medium 14B. As a result, a first generation copy of the record medium 14A is produced to the record medium 14B.

On the record medium 14B as the first generation copy of the record medium 14A, the copy management information SCMS-P for read-only record mediums and the copy management information SCMS-R for recordable record mediums that have been recorded on the record medium 14A are recorded as they are. Thus, on the record medium 14B as the first generation copy of the record medium 14A, (1, 0) and (0, 0) as the copy management information SCMS-P for read-only record mediums and the copy management information SCMS-R for recordable record mediums are recorded, respectively.

In addition, it is assumed that information of the record medium 14B is copied to a record medium 14C so as to produce a second generation copy of the record medium 14A.

When information is copied from the record medium 14B to the record medium 14C, the record medium 14B is reproduced. At that point, the copy management information is checked. Since the record medium 14B is a recordable record medium, the copy management information SCMS-R for recordable record mediums is checked. Since the copy management information SCMS-R for recordable record mediums is (0, 0), a copy operation is permitted. Thus, information is copied from the record medium 14B to the record medium 11C. As a result, information of the record medium 14B is copied to the recordable record medium 14C. A second generation copy of the original record medium 14A is produced on the record medium 14C.

On the record medium 14C as the second generation copy of the record medium 14A, the copy management information SCMS-P for read-only record mediums and the copy management information SCMS-R for recordable record mediums that have been recorded on the record medium 14B are recorded as they are. Thus, on the record medium 14C as the second generation copy of the record medium 14A, (1, 0) and (0, 0) as the copy management information SCMS-P for read-only record mediums and the copy management information SCMS-R for recordable record mediums are recorded, respectively.

When (1, 0) and (0, 0) as the copy management information SCMS-P for read-only record mediums and the copy management information SCMS-R for recordable record mediums have been recorded on the original record medium 14A, it can be freely copied.

Next, the case that an original record medium 15A is copied will be described. The original record medium 15A is a writable record medium. On the original record medium 15A, (1, 0) and (0, 1) as the copy management information SCMS-P for read-only record mediums and the copy management information SCMS-R for recordable record mediums have been recorded, respectively. It is assumed that information of the record medium 15A is copied to a record medium 15B so as to produce a first generation copy of the record medium 15A.

When information is copied from the record medium 15A to the record medium 15B, the record medium 15A is reproduced. At that point, the copy management information is checked. Since the original record medium 15A is a recordable record medium, the copy management information SCMS-R for recordable record mediums is checked. Since the copy management information SCMS-R for recordable record mediums is (0, 1), a copy operation is permitted in one generation. Thus, information is copied from the record medium 15A to the record medium 15B. As a result, on the record medium 15B, a first generation copy of the original record medium 15A is produced.

At that point, the copy management information is changed (namely, rewritten) so that the information can be recorded in only one generation. In other words, on the record medium 15B as a first generation copy, the copy management information SCMS-P for read-only record mediums is (1, 0). On the other hand, the copy management information SCMS-R for recordable record mediums is rewritten to (1, 1) so that a further copy operation is prohibited.

For example, it is assumed that information of the record medium 15B is tried to be copied to a record medium 15C so as to produce a second generation copy of the record medium 15A.

When information is copied from the record medium 15B to the record medium 15C, the record medium 15B is reproduced. At that point, the copy management information is checked. Since the record medium 15B is a recordable record medium, the copy management information SCMS-R for recordable record medium is checked. Since the copy management information SCMS-R for recordable record mediums is (1, 1), a copy operation is prohibited. Thus, information of the record medium 15B cannot be copied to the record medium 15C.

In such a manner, when (1, 0) and (0, 1) as the copy management information SCMS-P for read-only record mediums and the copy management information SCMS-R for recordable record mediums have been recorded on the original record medium 15A, respectively, a copy operation is permitted in only one generation.

Next, the case that an original record medium 16A is copied will be described. The original record medium 16A is a recordable record medium. On the original record medium 16A, (1, 0) and (1, 1) as the copy management information SCMS-P for read-only record mediums and the copy management information SCMS-R for recordable record mediums have been recorded, respectively. It is assumed that information of the record medium 16A is tried to be copied to a recordable record medium 16B so as to produce a first generation copy of the record medium 16A.

When information is copied from the record medium 16A to the record medium 16B, the record medium 16A is reproduced. At that point, the copy management information is checked. Since the original record medium 16A is a recordable record medium, the copy management information SCMS-R for recordable record mediums is checked. Since the copy management information SCMS-R for recordable record mediums is (1, 1), a copy operation is prohibited. Thus, information cannot be copied from the record medium 16A to the record medium 16B.

Thus, when (1, 0) and (1, 1) as the copy management information SCMS-P for read-only record mediums and the copy management information SCMS-R for recordable record mediums have been recorded on the original record medium 16A, respectively, a copy operation is prohibited.

FIGS. 8 and 9 show the relation between the states of the copy management information SCMS-P for read-only record mediums and the copy management information SCMS-R for recordable record mediums and copy operations controlled corresponding thereto. In FIGS. 8 and 9, in bits b0 to b3, bits b0 and b1 represent the copy management information SCMS-P for read-only record mediums, whereas bits b2 and b3 represent the copy management information SCMS-R for recordable record mediums.

In the description with reference to FIGS. 3 and 7, the copy management information SCMS-P for read-only record mediums and the copy management information SCMS-R for recordable record mediums are separately described. However, in FIGS. 8 and 9, the copy management information is treated as four bits of which two high order bits and two low order bits are used to represent the copy management information SCMS-P for read-only record mediums and the copy management information SCMS-R for recordable record mediums, respectively. FIG. 8 shows definitions of the copy management information SCMS-P and SCMS-R that are basically the same as the conventional SCMS. FIG. 9 shows the states of the copy management information SCMS-P and SCMS-R and copy operations corresponding thereto.

According to the above-described first embodiment, a plurality of types of copy management information corresponding to a plurality of types of record mediums are provided. The plurality of types of copy management information corresponding to the plurality of types of record mediums are recorded on one record medium at a time. When the record medium is reproduced, the type thereof is determined. The copy management information corresponding to the type of the record medium is selected. Corresponding to the selected copy management information, the copy managements are performed.

According to a second embodiment, reproduction management information is used instead of the copy management information used in the above-described first embodiment.

The reproduction management is performed in such a manner that unless a predetermined fee is paid, a reproducing operation is not permitted. When the predetermined fee is paid, a reproducing operation is permitted. When the reproduction management is performed, a fee paid for reproducing an original record medium may be different from a fee paid for reproducing a copied record medium. According to the above-described first embodiment, a copy prohibition in each generation is controlled. Thus, when the copy management information used in the first embodiment is substituted with the reproduction management information, a reproducing operation can be controlled in each generation.

In other words, according to the second embodiment, reproduction management information DRM-P for read-only record mediums and reproduction management information DRM-R for recordable record mediums are used. For example, the reproduction management information DRM-P and DRM-R are defined as shown in FIG. 10.

Figure 10:
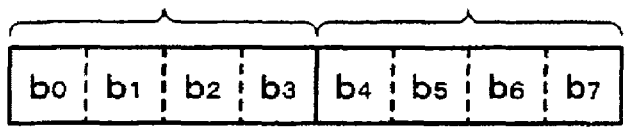
FIG. 10 is a schematic diagram for explaining reproduction management information.

In FIG. 10, bits b0 to b3 are reproduction management information DRM-P for read-only record mediums, whereas bits b4 to b7 are reproduction management information DRM-R for writable record mediums.

Since the reproduction management control manages a reproducing operation depending on whether the record medium is an original record medium or a non-original record medium, it can be stated that the reproduction management information DRM-P for read-only record mediums is reproduction management information for original record mediums and the reproduction management information DRM-R for recordable record mediums is reproduction management information for non-original record mediums.

When two high order bits of each of the reproduction management information DRM-P and DRM-R are (1, 0), they represent a charged reproduction. At that point, the two low order bits of each of the reproduction management information DRM-P and DRM-R represent charging conditions. For example, when the two low order bits are (0, 0), \10 per song is charged. When the two low order bits are (0, 1), \100 per song is charged. For example, when two low order bits are (1, 0), \1 for reproduction every 30 seconds is charged. When the two low order bits are (1, 1), \2 for reproduction every 30 seconds is charged.

For example, it is assumed that two types of reproduction management information DRM-P and DRM-R recorded on a record medium are (0, 0, 0, 0) and (1, 0, 1, 0), respectively. In this case, when the record medium that is reproduced is a read-only record medium, the reproduction management information DRM-P for read-only record mediums is used. Since the reproduction management information DRM-P for read-only record mediums is (0, 0, 0, 0), a free reproduction is performed. In contrast, when the record medium that is reproduced is a writable record medium, the reproduction management information DRM-R for writable record mediums is used. Since the reproduction management information DRM-R for writable record mediums is (1, 0, 1, 0), \1 for reproduction every 30 seconds is charged.

For example, it is assumed that information of an original record medium is copied to another recordable record medium. In this case, the record medium to which the information has been copied is a recordable record medium. Thus, the reproduction is controlled corresponding to the reproduction management information DRM-R for recordable record mediums. Since the reproduction management information DRM-R for writable record mediums is (1, 0, 1, 0), \1 for reproduction every 30 seconds is charged.

Thus, when an original record medium is a read-only record medium, if (0, 0, 0, 0) and (1, 0, 1, 0) as the reproduction management information DRM-P and the reproduction management information DRM-R for recordable record mediums have been recorded on the original record medium, the type of the record medium is determined. When the original record medium is reproduced, a free reproduction is performed. When information is reproduced from a copied record medium, \1 for reproduction every 30 seconds is charged.

FIG. 11 shows the relation between states of the reproduction management information DRM-P for read-only record mediums and reproduction management information DRM-R for recordable record mediums and reproducing operations performed corresponding thereto. In the example, in bits b0 to b7, bits b0 to b3 represent reproduction management information DRM-P for read-only record mediums and bits b4 to b7 represent reproduction management information DRM-R for recordable record mediums.

In the above-described examples, using information for read-only record mediums and information for writable record mediums, a control in only one generation is performed. In other words, according to the first embodiment, using the copy management information SCMS-P for read-only record mediums and the copy management information SCMS-R for recordable record mediums, copy operations for an original record medium and a copied record medium are controlled. In contrast, according to the second embodiment, using the reproduction management information DRM-P for read-only record mediums and reproduction management information DRM-R for recordable record mediums, reproducing conditions for an original record medium and a copied record medium are controlled.

When generations can be managed with a particular means, a copy control can be extended to a plurality of generations as shown in FIG. 12.

In the example shown in FIG. 12, copy management information CP1 for original record mediums, copy management information CP2 for first generation copied record mediums, and copy management information CP3 for second or later generation copied record mediums are recorded at a time. The generation of the reproduced record medium is determined. When the record medium is an original record medium, a copy process is performed corresponding to the copy management information CP1 for original record mediums. When the record medium is a first generation copied record medium, a copy process is performed corresponding to the copy management information CP2 for first generation copied record mediums. When the record medium is a second or later generation copied record medium, a copy process is performed corresponding to the copy management information CP3 for second or later generation copied record mediums.

Of course, by adding copy management information, copy operations in the third generation and fourth generation can be managed.

When the copy management information is extended, even if a copy operation in the second generation is prohibited, a charged copy operation may be permitted. For example, in FIG. 12, the copy management information CP1 for original record mediums and the copy management information CP2 for first generation copied record mediums represent conditions in which a copy operation is permitted or prohibited. When a copy operation is permitted, it can be freely performed. The copy management information CP3 for second or later generation copied record mediums represents charging conditions when a free copy operation is prohibited and a charged copy operation is permitted. Thus, although a copy operation in the second or later generation is prohibited, a charged copy operation in the second or later generation may be permitted.

FIG. 13 shows copy conditions corresponding to characteristics of record mediums. In other words, in the example, copy management information CP11 for CD, copy management information CP12 for CD-R, copy management information CP13 for hard disk drive, copy management information CP14 for so-called MD (Mini Disc), and copy management information CP15 for semiconductor memory card are provided. These copy management information CP11 to CP15 are recorded on a record medium at a time. When the record medium is reproduced, corresponding to the reproducing device, one of the copy management information CP11 to CP15 is selected. Corresponding to the reproducing device and the copy management information corresponding thereto, the copy operation is controlled.

FIG. 14 shows an example of copy management information recorded as copy management information CP11, CP12, CP13, CP14, and CP15. In the example, it is assumed that a record medium for the CD is an original record medium and thereby the copy management information CP11 for CD is (0, 0, 0, 1). Thus, it represents that a copy operation is permitted in only one generation. Thus, one generation copy of the original record medium is permitted. The copy management information for CD is (0, 1, 1, 1) so that a copy operation for CD-R is prohibited. The copy management information CP13 for hard disk is (1, 0, 1, 0) so that although data can be temporarily recorded to the hard disk, data cannot be reproduced therefrom. The copy management information CP14 for MD is (0, 1, 1, 1) so that a copy operation for MD is prohibited. Since a memory card can copy data at high speed, the copy management information CP15 for memory card is (0, 1, 1, 0) so that a copy operation is prohibited and only a moving operation is permitted. In this example, "moving operation" represents a process or an operation of which when information is copied from a copy source medium to a copy destination medium, the information copied on the copy source medium is prohibited from being reproduced and information copied on the copy destination medium is permitted to be reproduced.

Alternatively, conditions of which a copy operation is permitted in one time speed and a copy operation is prohibited in four times speed may be designated. In this example, "one time speed" represents a standard record/reproduction speed defined in standard applied for the medium. Likewise, "four times speed" represents a speed four times higher than the standard record/reproduction speed.

As was described above, when a plurality of types of copy management information, reproduction management information, and charging management information corresponding to a plurality of types of reproducing devices are recorded at a time. When a copy condition, a reproducing condition, and a charging condition for the device are selected and designated, a copy operation, a reproducing operation, and a charging operation can be managed in a plurality of generations. All the plurality of types of copy management information, reproduction management information, and charging management information corresponding to the plurality of devices may be recorded. Alternatively, one or several of the plurality of types of copy management information, reproduction management information, and charging management information corresponding to the plurality of devices may be recorded.

Corresponding to a condition of which the record medium is an original record medium or a copied record medium, a plurality of types of copy management information, reproduction management information, and charging management information may be recorded at a time. In addition, information about medium types may be provided.

Figure 15:
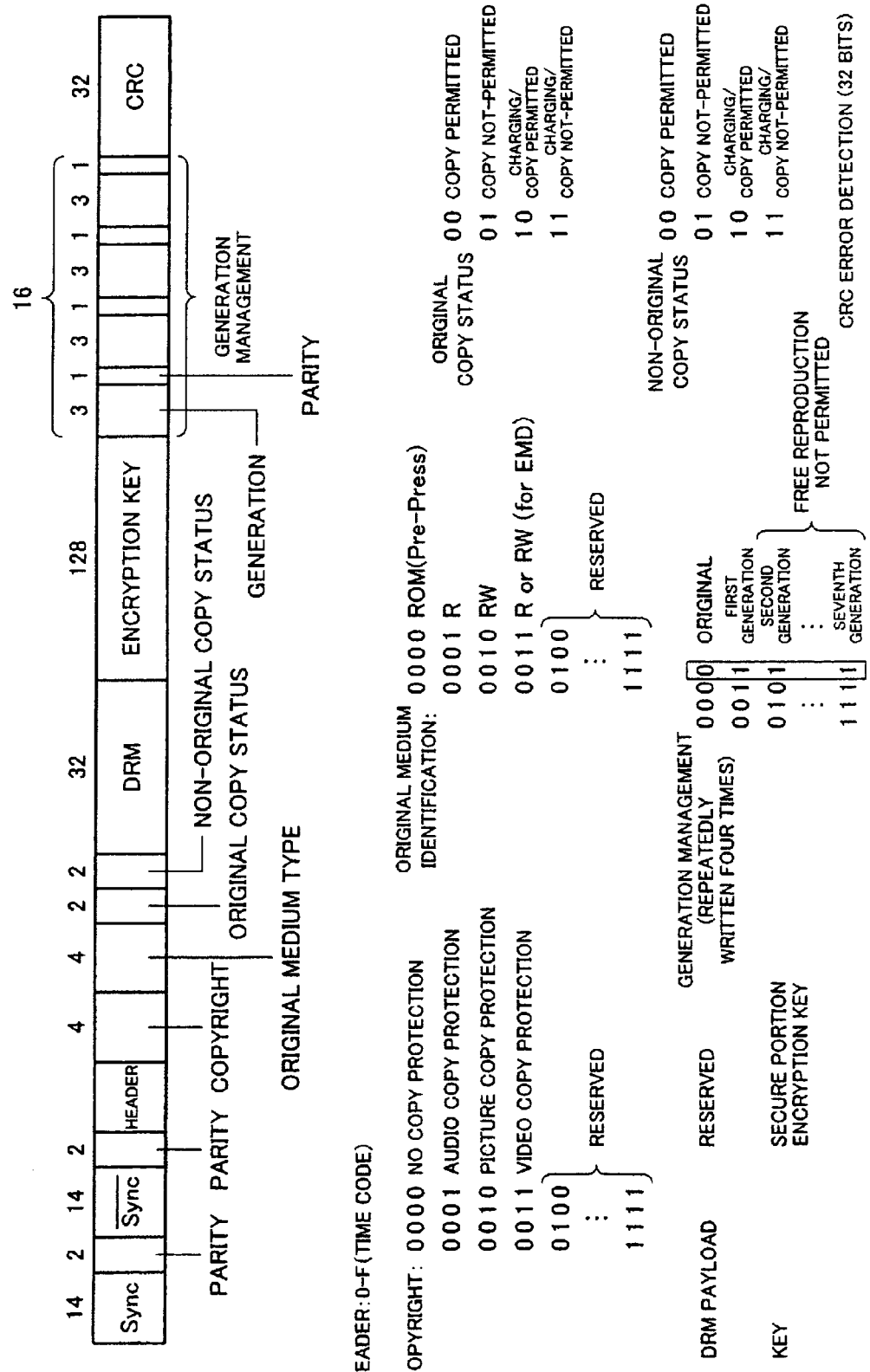
FIG. 15 is a schematic diagram showing an example of a record format of additional information recorded as a watermark.

For example, FIG. 15 shows an example of the structure of data of a watermark superimposed to data of a content recorded on an optical disc. In FIG. 15, watermark information is superimposed and recorded to data of a content. One unit of the watermark information is composed of 256 bits. The watermark information is repeatedly written for example 16 times.

At the beginning of each unit of 256 bits of the watermark information, sync data and parity are placed. The sync data is composed of a patterned sync having a predetermined pattern and an inverted sync thereof. Each of the patterned sync and the inverted pattern is composed of for example 14 bits. Corresponding to the sync data, an error detection parity and an error correction parity are placed. The parities separate the patterned sync from the inverted sync.

The sync data is followed by a header of four bits. As mentioned above, the data of the watermark is repeatedly written 16 times. The header is time code used to count the watermarks repeatedly written.

The header is followed by copyright information of four bits, original medium identification information of four bits, original copy status information of two bits, and non-original copy status information of two bits.

The copyright information designates whether or not a copy protection can be performed. In the example, a copy protection can be designated for each of content types such as audio and video.

The original medium identification information describes the medium type of the original of the content. When the medium is an original medium, the type of the record medium represented by the original medium identification information should match the type of the reproduced record medium. When the type of the record medium represented by the original medium identification information is compared with the type of the record medium that is actually reproduced, it can be determined whether the record medium is an original record medium or a non-original record medium.

The original copy status represents copy and charging conditions when the record medium is an original record medium.

The non-original copy status represents copy and charging conditions when the record medium is a non-original record medium.

The non-original copy status is followed by a DRM (Digital Rights Management) payload of 32 bits (reserved). The DRM payload contains management information.

The DRM payload is followed by an encryption key of 128 bits. The encryption key is followed by generation management information of 16 bits.

The generation management information represents whether the record medium is an original record medium or a copied record medium. When the record medium is a copied record medium, the generation management information represents in what generation the record medium has been copied. In the example, the generation management information is repeatedly written four times. Whenever the content is copied, the generation management information is rewritten.

The generation management information is followed by error detection CRC code of 32 bits. The CRC code is used to detect an error.

The generation management information is repeatedly written four times so as to improve the reliability thereof. In other words, since it is difficult to rewrite information of the watermark, the generation management information is not contained in a CRC error detection block. If the generation management information is contained in an error detection block, whenever the generation is rewritten, the CRC code should be calculated and changed. However, when the generation management information is not contained in a CRC block, the reliability is lost. To prevent such a problem, the generation management information is repeatedly written four times so as to improve the reliability thereof.

In the example, the original medium identification information is provided. With the original medium identification information, the type of an original medium can be identified. When the reproduced record medium is an original record medium, the type of the record medium represented by the original medium identification information must be the same as the type of the record medium that is actually reproduced. Thus, when the identification information of the original medium is compared with the type of the record medium that is actually reproduced, it can be determined whether the reproduced record medium is an original record medium or a non-original record medium.

In the example, there are an original copy status and a non-original copy status. When the record medium is an original record medium, corresponding to the original copy status, a copy operation, a reproducing operation, and a charging operation are controlled. When the record medium is a non-original record medium (namely, a copied record medium), corresponding to the non-original copy status, a copy operation, a reproducing operation, and a charging operation are controlled.

In the example, generation information is provided. With the generation information, a process corresponding to a copy generation can be performed.

Figure 16:
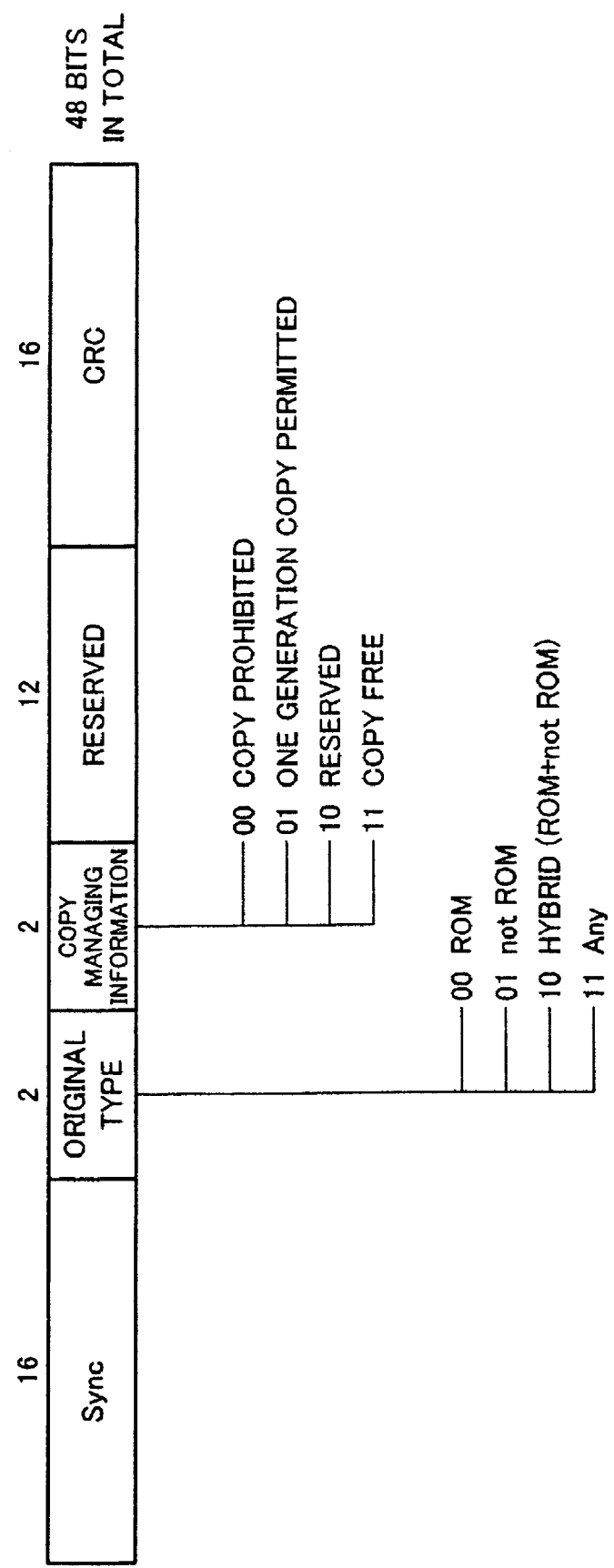
FIG. 16 is a schematic diagram showing another example of a record format of additional information recorded as a watermark.

FIG. 16 shows a third embodiment. In the above-described examples, when data of a content is recorded, a plurality of types of copy management information corresponding to a plurality of types of record mediums are recorded at a time. The type of the record medium on which data of a content has been recorded is determined. With the copy management information corresponding to the record medium, a copy operation is managed.

On the other hand, in this example, original type information and copy management information are pare-recorded on a record medium. The type of the record medium obtained corresponding to the original type information is compared with the type of the record, medium that is actually reproduced so as to determine whether or not the record medium is an original record medium. When the determined result represents that the record medium is an original record medium, using the copy management information recorded on the record medium, a copy operation is managed. In contrast, when the determined result represents that the record medium is not an original record medium, a copy operation is managed by supposing that the record medium is a copied record medium and thereby the generation of the copy management information has been advanced.

FIG. 16 shows the structure of a watermark embedded to data of a content in such a case. Data of a watermark is embedded to the least significant bit of data of a content. Data of a watermark is processed as one information unit (packet) of 48 bits.

In the example, a watermark is embedded to the least significant bit of a content. Of course, a spectrum spreading method, a method for detecting a peak value and embedding a watermark thereto, a method for embedding a watermark to a high order coefficient of compressed data, a method using masking, and so forth can be used.

As shown in FIG. 16, at the beginning of one packet (48 bits) of data of a watermark, a sync is placed. The sync is used to detect the beginning of the packet and establish synchronization thereof.

The sync is followed by original type information of two bits. The original type information is used to identify the type of an original record medium. When the original type information is (0, 0), it represents that the original record medium is a read-only medium (such as CD-DA (Compact Disc-Digital Audio) or CD-ROM (Compact Disc Read Only Memory). When the original type information is (0, 1), it represents that the original record medium is a non-ROM recordable record medium (such as CD-R (Compact Disc Recordable) or CD-RW (Compact Disc Rewritable)). When the original type information is (1, 0), it represents that the original record medium is a hybrid record medium (having a ROM area and a non-ROM area).

The original type information is followed by copy management information of two bits. When the copy management information is (0, 0), it represents that a copy operation is prohibited. When the copy management information is (0, 1), it represents that a copy operation is permitted in one generation. When the copy management information is (1, 1), it represents that a copy operation can be freely performed.

In the example, when the original type information recorded on the record medium is different from the type of the real record medium and thereby the determined result represents that the record medium is a copied record medium, since it is supposed that a copy operation has been performed in at least one generation, supposing that copy management information of which the copy generation is advanced by one is new copy management information, a copy operation is managed. In this case, when the determined result represents that the record medium is not an original record medium, supposing that copy management information of which the copy generation is advanced by one is new copy management information, even if the copy management information is not rewritten, a copy generation can be managed.

In other words, by comparing the type of the record medium represented by the original type information with the type of the record medium that is actually reproduced, it is determined whether or not the record medium is an original record medium. When the determined result represents that the record medium is an original record medium, corresponding to the copy management information of the record medium, a copy operation is managed.

On the other hand, when the type of the record medium represented by the original type information is compared with the type of the record medium that is actually reproduced, if the determined result represents that the record medium is not an original record medium, corresponding to copy management information of which the copy generation has been advanced by one, a copy operation is managed.

Figure 17:
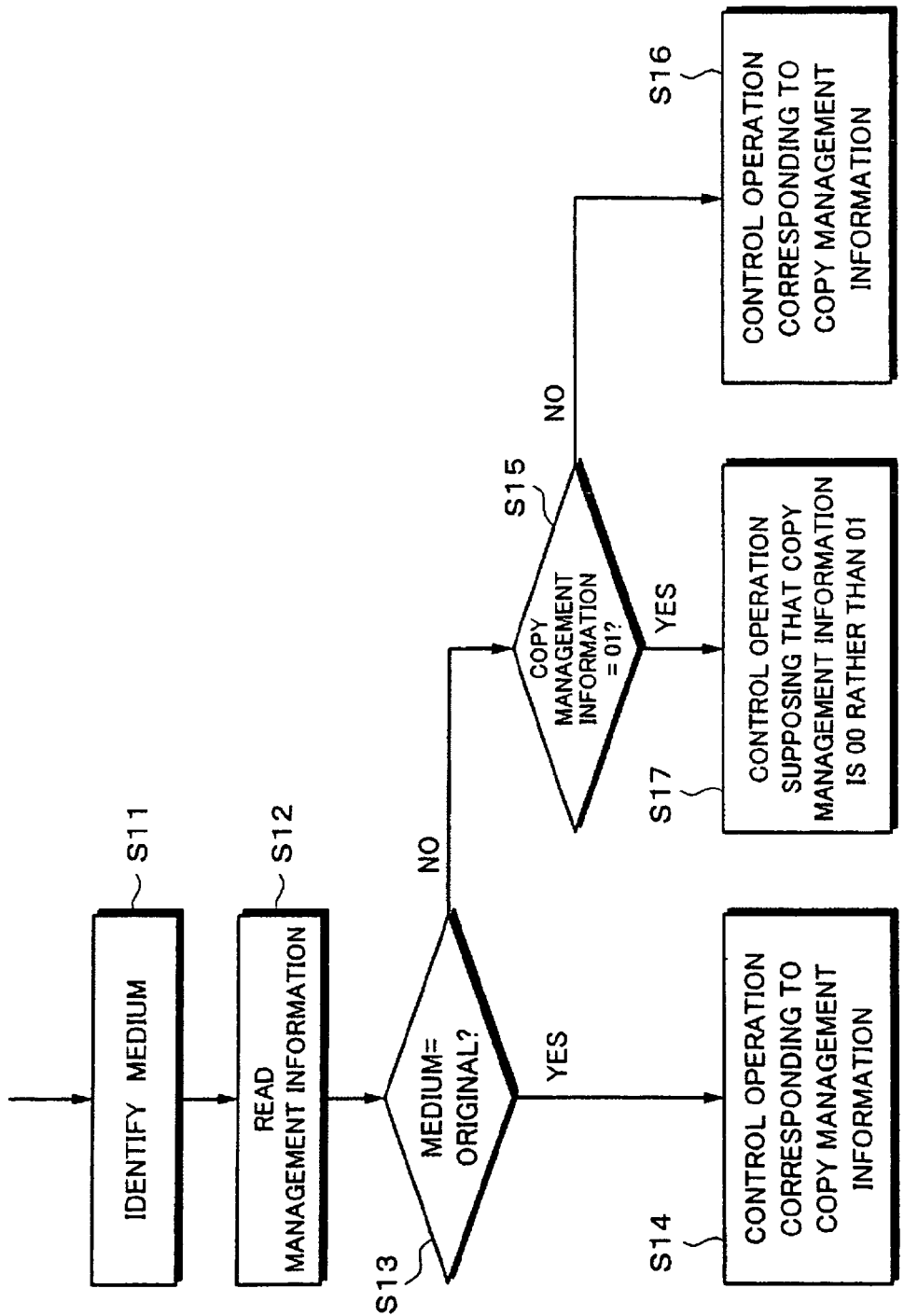
FIG. 17 is a flow chart for explaining another embodiment of the present invention.

FIG. 17 is a flow chart showing the above-described process. In FIG. 17, when the record medium is reproduced, the type of the reproduced record medium is identified (at step S11). When the record medium is a reproduction-only record medium, since it contains wobble information of which pits are wobbled and recorded in the track direction (namely, the radius direction of the record medium), the type of the record medium can be determined depending on whether or not the wobble information can be detected.

Thereafter, the original type information is read from the management information (at step S12).

The type of the record medium identified at step S11 is compared with the original type information that is read at step S12. Corresponding to the compared result, it is determined whether or not the record medium that is reproduced is an original record medium (at step S13).

When the determined result at step S11 represents that the record medium that is reproduced is a CD-ROM and the original type information that is read at step S12 is (0, 0), which represents a read-only record medium, since the type of the record medium that is reproduced matches the original type information, it is determined that the record medium is an original record medium. In contrast, when the determined result at step S11 represents that the record medium that is reproduced is a CD-ROM and the original type information that is read at step S12 is (0, 1), which represents a non-ROM record medium, since the types of the record mediums are different, it is determined that the record medium is not an original record medium.

When the determined result at step S13 represents that the record medium is an original record medium, a copy operation is managed corresponding to the copy management information (at step S14).

In contrast, when the determined result at step S13 represents that the record medium is not an original record medium, a copy operation is managed corresponding to the copy management information of which the copy generation has been advanced by one.

When the determined result at step S13 represents that the record medium is not an original record medium, it is determined whether or not the copy management information is (0, 1) (at step S15).

When the determined result at step S15 represents that the copy management information is not (0, 1), a copy operation is managed corresponding to the copy management information (at step S16). In other words, when the copy management information is (1, 1), which represents that a copy operation can be freely performed, even if the copy generation is advanced by one, the copy management information is not changed from the copy free state (1, 1). Likewise, when the copy management information is (0, 0), which represents that a copy operation is prohibited, even if the copy generation is advanced by one, the copy management information is not changed from (0, 0). Thus, when the copy management information is (1, 1), a copy operation is permitted. In contrast, when the copy management information is (0, 0), a copy operation is prohibited.

When the determined result at step S15 represents that the copy management information is (0, 1), the copy generation of the copy management information is advanced by one. Supposing that the copy management information is (0, 0), a copy operation is managed (at step S17). When the copy management information is (0, 1), which represents that a copy operation is permitted in one generation, if the copy generation is advanced by one, the copy management information becomes (0, 0), which represents that a copy operation is prohibited. Thus, when the copy management information is (0, 1), supposing that the copy management information is (0, 0), a copy operation is prohibited.

As was described above, in the example, when the original type information recorded on the record medium is different from the type of the real record medium and thereby it is determined that the record medium is a copied record medium, since it is considered that a copy operation has been performed in at least one generation, supposing that the copy generation of the management information has been advanced by one, a copy operation is managed. When the determined result represents that the record medium is not an original record medium, supposing that the copy generation of the copy management information has been advanced by one, a copy operation is managed. Thus, without need to rewrite the copy management information, the copy generation can be managed.

In the above-described example, when the record medium is not an original record medium and the copy management information is (0, 1), a process is performed supposing that the copy management information is (0, 0) of which the copy generation has been advanced by one. In this case, however, as shown in FIG. 18, the copy management information may be rewritten.

Figure 18:
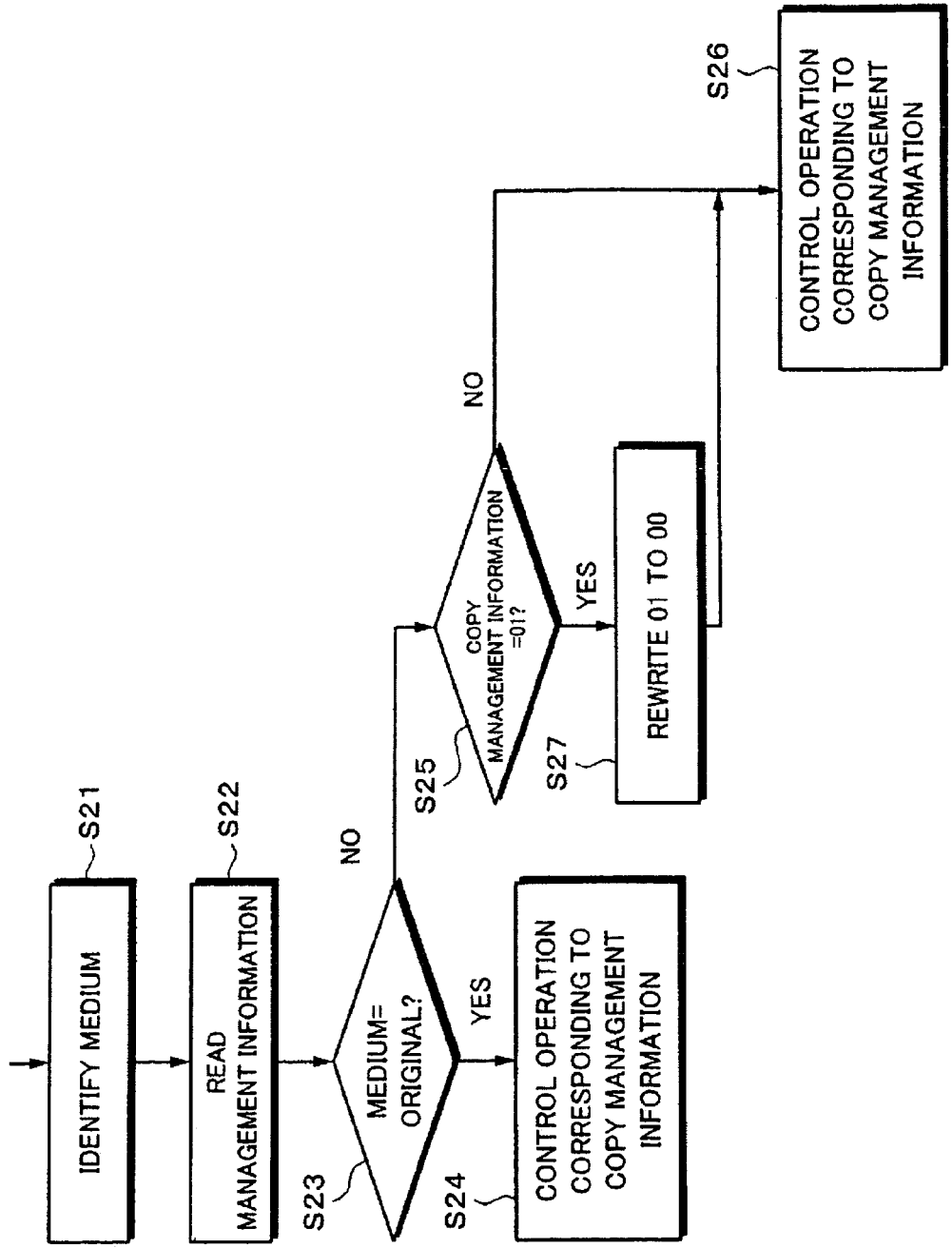
FIG. 18 is a flow chart for explaining another embodiment of the present invention.

In FIG. 18, steps S21 to S26 are the same as steps S11 to S16 shown in FIG. 17. At step S25, when the record medium is not an original record medium and the copy management information is (0, 1), the flow advances to step S27. At step S27, the copy management information is changed from (0, 1) to (0, 0). Thereafter, at step S26, corresponding to the copy management information, a copy operation is managed.

Figure 19:
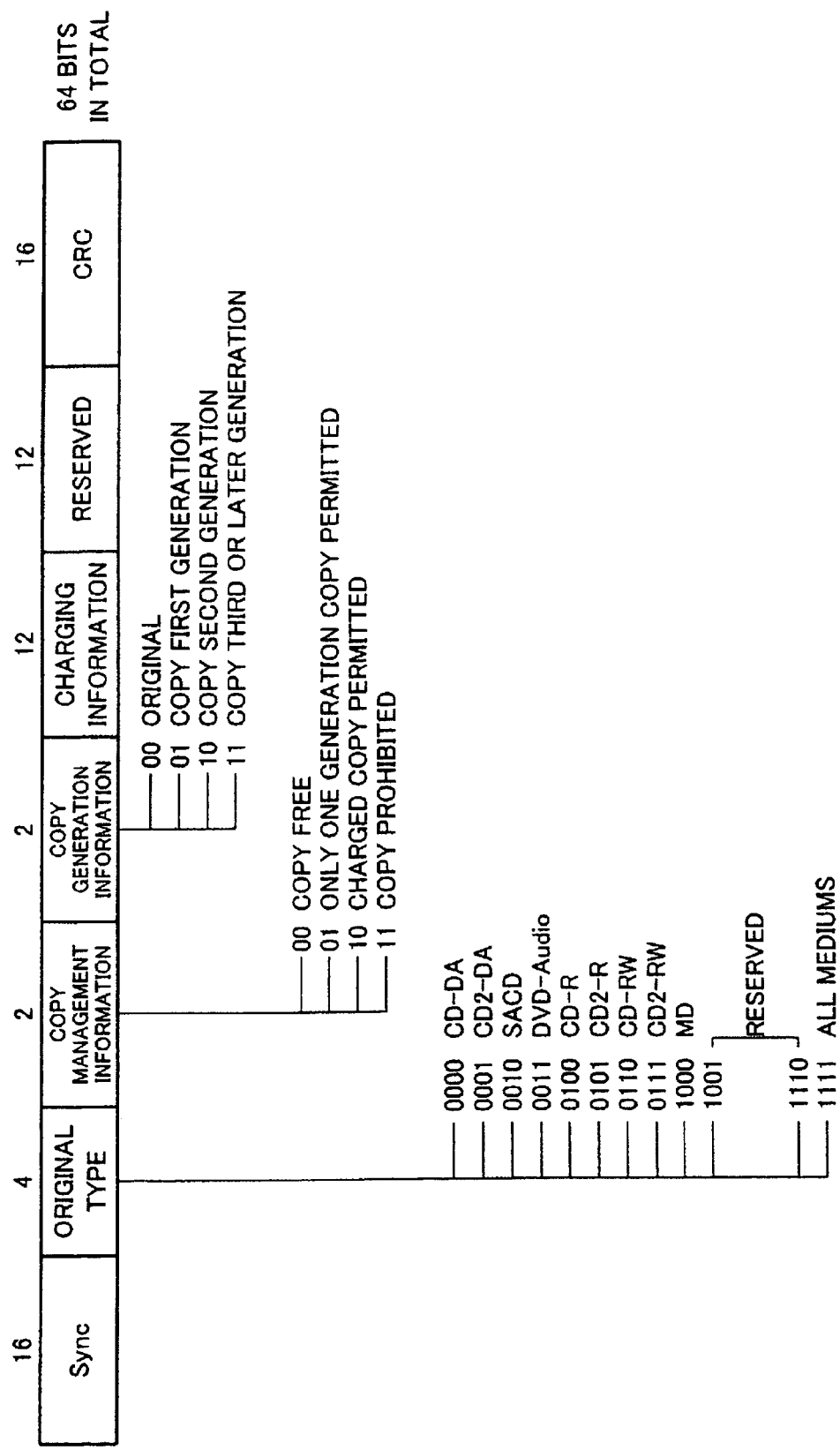
FIG. 19 is a schematic diagram showing another example of a record format of additional information recorded as a watermark.

FIG. 19 shows another example. In the example, copy generation information is provided. The copy generation information represents in what generation the record medium has been copied. With the copy generation information, a copy operation can be managed in a plurality of generations.

As shown in FIG. 19, data of a watermark is processed as one information unit (packet) of 64 bits. At the beginning of a packet, a sync of 16 bits is placed. The sync is used to detect the beginning of the packet and establish synchronization thereof.

The sync is followed by original type information of four bits. The original type information represents the type of an original record medium. For example, when the original type information is (0, 0, 0, 0), it represents a CD-DA format disc as a record medium. When the original type information is (0, 0, 0, 1), it represents a CD-DA2 format disc as a record medium. When the original type information is (0, 0, 1, 0), it represents an SA (Super Audio)-CD format disc as a record medium. When the original type information is (0, 0, 1, 1), it represents a DVD (Digital versatile Disc) audio format disc as a record medium. When the original type information is (0, 1, 0, 0), it represents a CD-R format disc as a record medium. When the original type information is (0, 1, 0, 0), it represents a CD2-R format disc as a record medium. When the original type information is (0, 1, 1, 0), it represents a CD-RW format disc as a record medium. When the original type information is (0, 1, 1, 1), it represents a CD2-RW format disc as a record medium. When the original type information is (1, 0, 0, 0), it represents an MD (Mini Disc) format disc as a record medium. When the original type information is (1, 1, 1, 1), it represents any record medium.

The original type information is followed by copy management information of two bits. The copy management information is used to mange copyright. For example, when the copy management information is (0, 0), it represents that a copy operation can be freely performed. When the copy management information is (0, 1), it represents that a copy operation is permitted in only one generation. When the copy management information is (1, 0), it represents that a charged copy operation is permitted. When the copy management information is (1, 1), it represents that a copy operation is prohibited.

The copy management information is followed by generation information of two bits. For example, when the generation information is (0, 0), it represents an original. When the generation information is (0, 1), it represents a first generation copy. When the generation information is (1, 0), it represents a second generation copy. When the generation information is (1, 1), it represents a third or later generation copy.

The copy generation information is followed by charging information of 12 bits. When a copy operation is permitted with a fee or when a fee is paid whenever each song is reproduced, the copy generation information is followed by the charging information.

The charging information is followed by a reserved area of 12 bits. At the end of one packet, CRC code of 16 bits is placed. The CRC code is used to detect an error.

In the example shown in FIG. 19, as was described above, the copy generation information is provided. The copy generation information represents in what generation data recorded on the record medium has been copied. Whenever a copy operation is performed, the copy generation information is rewritten.

In consideration of the original type information and copy generation information recorded on the record medium and the type of the real record medium together, it is determined whether or not the record medium is an original record medium. When the determined result represents that the record medium is not an original record medium, since it is considered that a copy operation has been performed in at least one generation, the copy generation of the copy generation information is advanced by one. In such a manner, a copy operation can be managed in a plurality of generations.

Figure 20:
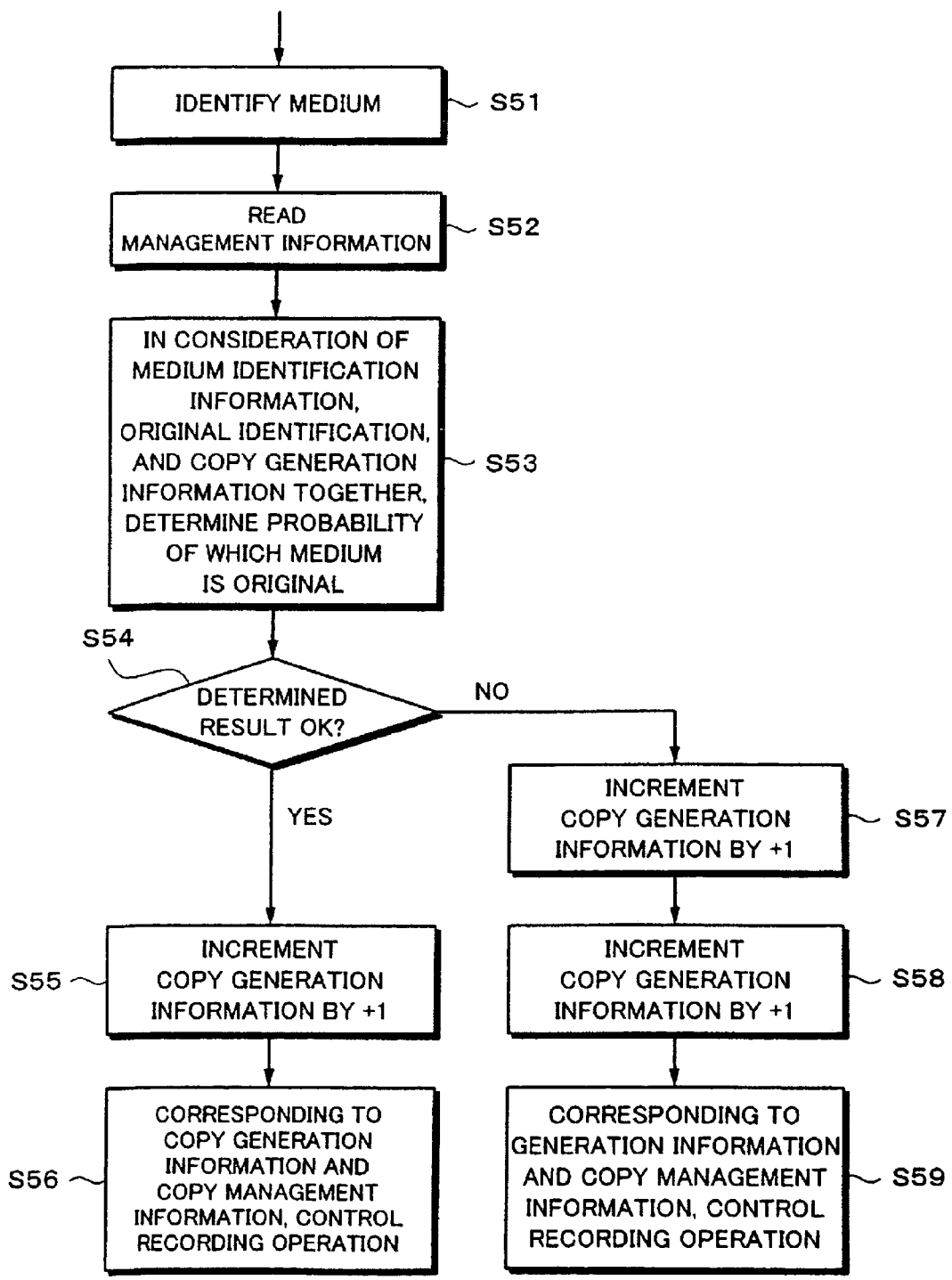
FIG. 20 is a flow chart for explaining another embodiment of the present invention.

FIG. 20 is a flow chart showing the above-described process. In FIG. 20, when the record medium is reproduced, the type of the record medium that is reproduced or the type of the record medium as a copy source is identified (at step S51). Thereafter, the management information is read from the watermark (at step S52). The management information contains the original type, the copy management information, the copy generation information, the charging information, and so forth shown in FIG. 19.

In consideration of the record medium type identification information obtained at step S51 and the original identification information and the copy generation information contained in the management information that is read at step S52 together, the probability of which the record medium is an original record medium is checked (at step S53). As a result, it is determined whether or not the record medium is an original record medium (at step S54). Although the identified result of the record medium at step S51 is a recordable record medium, when the original identification information is (0000) or although the original identification information is (0000), when the copy generation information is (01), they are not consistent. Thus, it is determined that the record medium is not an original record medium.

When the determined result at step S54 represents that the record medium as a copy source is an original record medium, since the copy generation of the record medium is advanced by one, the copy generation information is incremented by one (at step S55).

Corresponding to the copy generation information, the copy management information, and the charging information, a recording operation is controlled (at step S56). In other words, when the copy management information is (0, 0), which represents that a copy operation can be freely performed, a copy operation for data is permitted. When the management information is (0, 1), which represents a copy operation is permitted in one generation, a copy operation for data is permitted. When the copy management information is (1, 0), which represents that a charged copy operation is permitted, if a charging operation is performed corresponding to the copy generation information and the charging information, a copy operation for data is permitted. When the copy management information is (1, 1), which represents that a copy operation is prohibited, a copy operation for data is prohibited.

When the determined result at step S54 represents that the record medium as the copy source is not an original record medium, since the record medium is not an original record medium, supposing that a copy operation has been performed in at least one generation, the copy generation information is incremented by one (at step S57).

When a copy operation for data is performed, since the copy generation of the generation information of the record medium in the next generation as the copy source is advanced by one, the next copy generation information is incremented by one (at step S58).

Thereafter, corresponding to the copy generation information, the copy management information, and the charging information, a recording operation is controlled (at step S59). At that point, at step S57, the copy generation management information has been incremented by one. With the copy generation management information of which the copy generation is advanced by one, a copy operation is managed.

In the above-described example, a copy operation is managed using the management information. In addition, a reproducing operation can be also managed.

Figure 21:
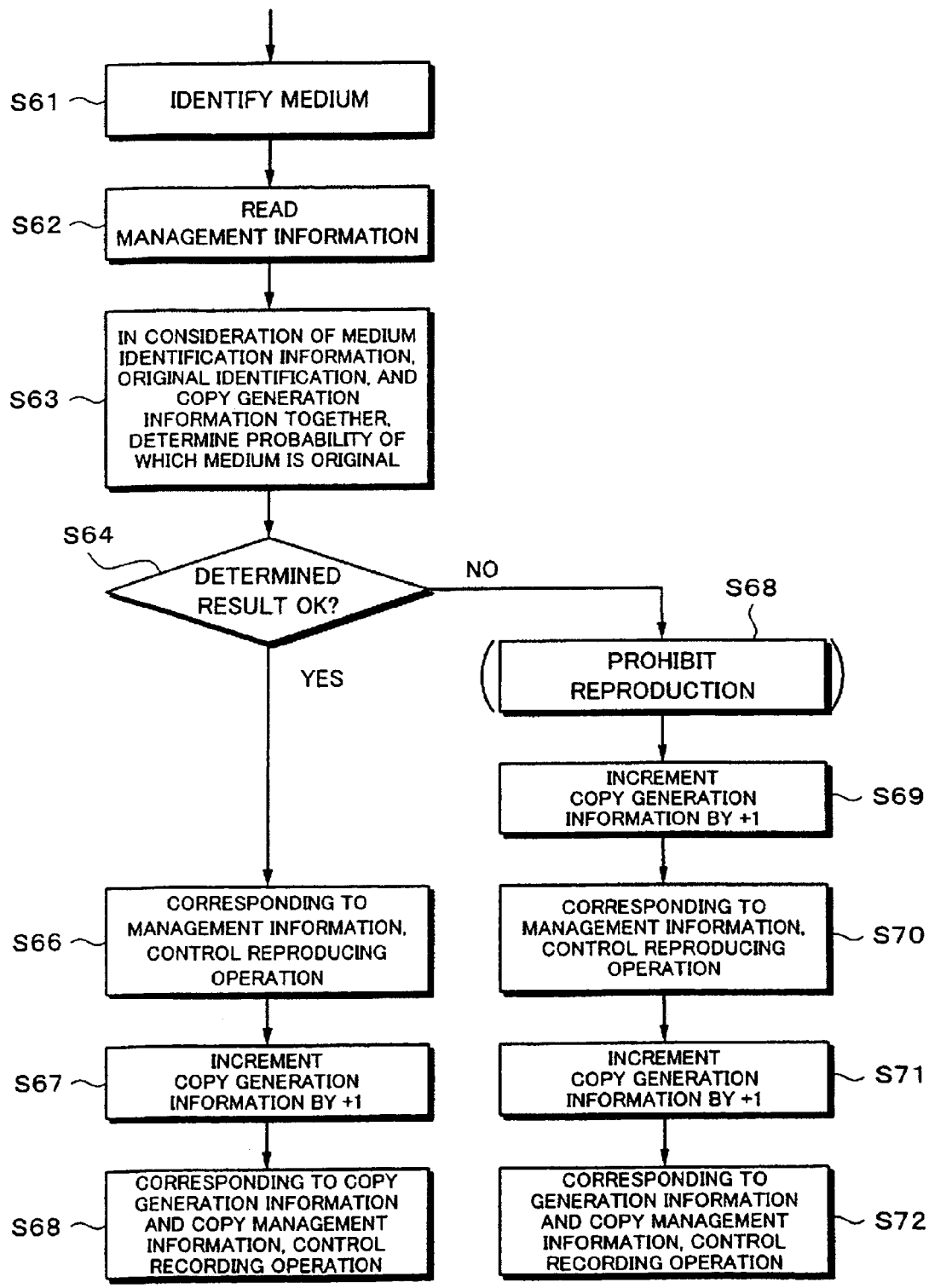
FIG. 21 is a flow chart for explaining another embodiment of the present invention.

FIG. 21 is an example of which a reproducing operation is managed using the management information. In FIG. 21, steps S61 to S64 are the same as steps S51 to S54 shown in FIG. 20.

When the determined result at step S64 represents that the record medium is an original record medium, the flow advances to step S65. At step S65, a reproducing operation is controlled corresponding to the management information. For example, as shown in FIG. 10, when data of a content to be reproduced from the record medium is charged data, a charging process should be normally performed. When the charging process has been normally performed, the data of the content is reproduced. Thereafter, the next copy generation information is incremented (at step S66). Corresponding to the copy generation information, the copy management information, and the charging information, the recording operation is controlled (at step S67).

When the determined result at step S64 represents that the record medium is not an original record medium, although it is clear that a copy operation has been performed in at least one generation, since the copy generation information has not been rewritten, a reproducing operation may be prohibited (at step S68).

Generally, since a copy operation has been performed in at least one generation, the copy generation information is incremented by one (at step S69). Corresponding to the copy generation information, the copy management information, and the charging information, a reproducing operation is controlled (at step S70). Thereafter, when a copy operation is performed, since the copy generation is advanced by one, the copy generation information is incremented by one (at step S71).

Corresponding to the copy generation information, the copy management information, and the charging information, a recording operation is controlled (at step S72). At that point, at step S69, the copy generation management information has been incremented by one. With the copy generation management information of which the copy generation has been advanced by one, a copy operation is managed.

Thus, in the example, when the original type information recorded on the record medium is different from the type of the real record medium, it is determined that the record medium is a copied record medium. In that case, since it is considered that a copy operation has been performed in at least one generation, supposing that the copy management information of which the copy generation has been advanced by one is the current copy management information, a copy operation is managed. Thus, without need to rewrite the copy management information, the copy generation can be managed.

In the example, assuming that a copy generation is managed in the precondition that whenever a copy operation is performed, the copy management information and the copy generation information are rewritten corresponding to a predetermined rule, when the original type information recorded on the record medium is different from the type of the real record medium, it is determined that the record medium is a copied record medium. In this case, corresponding to the predetermined rule, the copy management information and the copy generation information are forcedly rewritten. Thus, a copied record medium that does not comply with the predetermined rule is not distributed. Thus, the copyright can be protected.

In the above-described examples, a copy management in the case that a record medium such as a CD-DA disc or a CD-ROM disc on which data of a content has been recorded is copied to a recordable record medium such as a CD-R disc or a CD-RW disc was described. However, the present invention can be also applied for protecting copyright of music that is distributed through the Internet.

In other words, when music is distributed through the Internet, there is a risk of which data of a content is illegally copied and distributed. However, according to the present invention, when data of a content is reproduced by a non-original record medium, a copy operation and a reproducing operation can be restricted. Thus, when music is distributed through the Internet, the copyright can be protected.

According to the present invention, copy management information SCMS-P for read-only record mediums and copy management information SCMS-R for recordable record mediums are pre-recorded to a record medium at a time. When the record medium that is reproduced is a read-only record medium, a copy operation is controlled corresponding to the copy management information SCMS-P for read-only record mediums. In contrast, when the record medium that is reproduced is a recordable record medium, a copy operation is controlled corresponding to the copy management information SCMS-R for recordable record mediums. Thus, without need to rewrite the copy management information, a copy operation can be controlled in a plurality of generations.

When reproduction management information for read-only record mediums and reproduction management information for recordable record mediums are pre-recorded to a record medium, a reproducing operation can be controlled depending on whether the record medium is an original record medium or a copied record medium. When charging management information for read-only record mediums and charging management information for recordable record mediums are pre-recorded to a record medium, a reproducing operation can be controlled depending on whether the record medium is an original record medium or a copied record medium.

In addition, when original type information recorded on the record medium is different from the type of the real record medium and thereby it is determined that the record medium has been copied, since it can be assumed that a copy operation has been performed in at least one generation, a copy operation is managed supposing that copy management information of which the copy generation is advanced by one is new copy management information. Thus, without need to rewrite the copy management information, a copy generation can be managed.

Thus, assuming that whenever a copy operation is performed, copy management information and copy generation information are rewritten corresponding to a predetermined rule, the original type information recorded on the record medium is different from the type of the real record medium. When it has been determined that the record medium is a copied record medium, the copy management information and the copy generation information are forcedly rewritten corresponding to the predetermined rule. Thus, copied record mediums that do not comply with the predetermined rule are not distributed. Thus, the copyright can be protected.

INDUSTRIAL APPLICABILITY

As was described above, a record medium, a recording method for a record medium, an output controlling method, a reproducing apparatus, a record and reproduction controlling method, a recording method, a recording and reproducing method, and a recording and/or reproducing method according to the present invention are effective for protecting copyright of data that is copied from a CD format disc to a CD-R or CD-RW format disc.

The invention claimed is:

1. An output controlling method, comprising the steps of:
   reading content data and a plurality of types of management information from a record medium; the plurality of types of management information provided corresponding to a plurality of types of record media being embedded with the content data, the plurality of types of management information being recorded in a predetermined area of the record medium;
   extracting the plurality of types of management information from the content data that is read from the record medium;
   collating the plurality of types of management information that are extracted with the plurality of types of management information that are read from the record medium; and
   controlling an output of the content data that is read corresponding to the collated result.

2. The output controlling method as set forth in claim 1, wherein when the plurality of management information that is extracted does not match the plurality of types of management information that is read from the record medium, the controlling step is performed by not permitting the content data that is read from the record medium to be output.

3. The output controlling method as set forth in claim 2, wherein when the plurality of types of management information that is extracted match the plurality of types of management information that is read from the record medium, the controlling step is performed by controlling the output of the content data that is read from the record medium corresponding to the plurality of types of management information that is read from the record medium.

4. The output controlling method as set forth in claim 3, further comprising the step of:
   determining the type of the record medium,
   wherein the controlling step is performed by controlling the output of the content data that is read corresponding to a management condition selected corresponding to a management condition selected corresponding to the type of the record medium determined from the plurality of types of management information.

5. A reproducing apparatus for a record medium, comprising:
   a reading portion for reading content data and a plurality of types of management information from the record medium, the plurality of types of management information provided corresponding to a plurality of types of record media being embedded with the content data, the plurality of types of management information being recoded in a predetermined area of the record medium;
   an extracting portion for extracting the plurality of types of management information from the content data that is read from the record medium by said reading portion;
   a collating portion for collating the plurality of types of management information that are extracted by said extracting portion with the plurality of types of management information that are read from the record medium by said reading portion; and
   an output controlling portion for controlling an output of the content data that is read corresponding to the collated result by the collating portion.

6. The reproducing apparatus for the record medium as set forth in claim 5,
   wherein when the plurality of management information that is extracted by said extracting portion does not match the plurality of types of management information that is read from the record medium by said reading portion, said output controlling portion does not permit the content data that is read from the record medium to be output.

7. The reproducing apparatus for the record medium as set forth in claim 6,
   wherein said output controlling portion has a switch circuit portion, and
   wherein when the collated result of said collating portion represents that the plurality of types of management information extracted by said extracting portion does not match the plurality of types of management information that is read from the record medium by said reading portion, said switch circuit portion is opened.

8. The reproducing apparatus for the record medium as set forth in claim 7,
   wherein when the collated result of said collating portion represents that the plurality of types of management information extracted by said extracting portion match the plurality of types of management information that is read from the record medium by said reading portion, said switch circuit portion is closed and thereby the content data that is read from the record medium corresponding to the plurality of types of management information that is read from the record medium is output through said switch circuit portion.

9. The reproducing apparatus for the record medium as set forth in claim 5, further comprising:
   a determining portion for determining a type of the record medium corresponding to a signal that is read from the record medium by said reading portion,
   wherein one of the plurality of types of management information that is read from the record medium by said reading portion is selected corresponding to a result determined by said determining portion,
   wherein one of the plurality of types of management information extracted by said extracting portion is selected, and
   wherein the selected management information is supplied to said collating portion.

10. The reproducing apparatus for the record medium as set forth in claim 9,
wherein said determining portion comprises a first determining portion and said output controlling portion further comprises:
a second determining portion for determining a selected management condition corresponding to the result determined by said first determining portion; and
a switch circuit portion for controlling the output of the content data that is read from the record medium, the open state and close state of said switch circuit portion being controlled by an output of said second determining portion.

11. The reproducing apparatus for the record medium as set forth in claim 5,
wherein said extracting portion comprises first extracting portion and said reading portion has:
a head portion for reading the content data and the plurality of types of management information from the record medium;
a demodulating portion for decoding an output signal of said head portion;
a second extracting portion for extracting the plurality of types of management information from output content data of said demodulating portion; and
an error correction processing portion for performing an error correcting process for output content data of said demodulating portion and supplying the resultant output content data to said second extracting portion.

12. A record and reproduction controlling method for a record medium, comprising the steps of:
reading content data and a plurality of types of management information from a record medium, the plurality of types of management information provided corresponding to a plurality of types of record media being embedded as additional information to the content data, the plurality of types of management information being recoded in a predetermined area of the record medium;
extracting the additional information from the content data that is read from the record medium;
collating the plurality of types of management information that are contained in the extracted additional information with the plurality of types of management information that are read from the record medium; and
controlling an output of the content data that is read corresponding to the collated result.

13. The record and reproduction controlling method for the record medium as set forth in claim 12,
wherein when the plurality of management information that is contained in the extracted additional information does not match the plurality of types of management information that is read from the record medium, the controlling step is performed by not permitting the content data that is read from the record medium to be output.

14. The record and reproduction controlling method for the record medium as set forth in claim 13,
wherein when the plurality of types of management information that are contained in the extracted additional information match the plurality of types of management information that is read from the record medium, the controlling step is performed by controlling the output of the content data that is read from the record medium corresponding to the plurality of types of management information that is read from the record medium.

15. The record and reproduction controlling method for the record medium as set forth in claim 12, further comprising the step of:
determining the type of the record medium,
wherein the controlling step is performed by controlling the output of the content data that is read corresponding to a management condition selected corresponding to a management condition selected corresponding to the type of the record medium determined from the plurality of types of management information.

16. The record and reproduction controlling method as set forth in claim 15,
wherein said recording medium comprises a first recording medium and when the content data that is read corresponding to the selected management information is recorded to a second record medium, the controlling step is performed by recording the content data that is read from the record medium and the plurality of types of management information to the second record medium.

17. A reproducing method for a record medium, comprising the steps of:
determining the type of the record medium, content data and at least reproduction management information for reproduction-only record media and reproduction management information for recordable record media being recorded to the record medium; and
controlling a reproducing operation corresponding to the management information selected corresponding to the reproduction management information selected corresponding to the type of the record medium determined from the plurality of types of reproduction management information.

18. The reproducing method for the record medium as set forth in claim 17,
wherein the controlling step is performed by switching a charging process for the content data that is reproduced corresponding to the selected reproduction management information.

19. A recording method, comprising the steps of:
first determining a type of a record medium, a plurality of types of management information provided corresponding to types of record media being recorded to the record medium along with content data, the plurality of types of management information containing copy management information;
secondly determining whether the record medium is an original record medium corresponding to the management information that is read from the record medium and the type of the record medium determined at the first determining step; and
when a result determined at the first determining step represents that the record medium is an original record medium, controlling a recording operation for the content data that is read from the record medium to another record medium corresponding to the copy management information.

20. The recording method as set forth in claim 19, wherein said determining step comprises a first determining step and when the management information that is read from the record medium matches the type of the record medium determined at the first determining step, a result determined at the second determining step represents that the record medium is an original record medium.

21. The recording method as set forth in claim 19, wherein said determining step comprises a first determining step and the recording method further comprises the steps of:

when a result determined at the second determining step represents that the record medium is not an original record medium, determining whether the copy management information permits a copy operation to be performed in one generation; and when the copy management information permits a copy operation to be performed in one generation, advancing the generation of the copy management information by one, wherein the controlling step is performed by controlling the recording operation corresponding to the copy management information of which the generation has been advanced by one.

22. The recording method as set forth in claim 21, wherein the controlling step is performed by prohibiting the recording operation corresponding to the copy management information of which the generation has been advanced by one.

23. The recording method as set forth in claim 21, wherein when the copy management information does not permit a copy operation to be performed in one generation, the controlling step is performed by controlling the recording operation corresponding to the copy management information.

24. The recording method as set forth in claim 19, wherein the determining step comprises a first determining step and the recording method further comprises the step of:

when a result determined at the second determining step represents that the record medium is not an original record medium, determining whether the copy management information permits a copy operation to be performed in one generation; and when the copy management information permits the copy operation to be performed in one generation, rewriting the copy management information to prohibit a copy operation, wherein a controlling step is performed by controlling the recording operation corresponding to rewritten copy management information.

25. A recording method, comprising the steps of:

first determining a type of a first record medium, wherein a plurality of types of management information corresponding to a plurality of types of record media is recorded on the first record medium, and wherein the plurality of types of management information include identification information, copy generation information, and copy management information;

secondly determining whether the first record medium is an original record medium corresponding to the management information that is read from the first record medium and the type of the first record medium determined at the first determining step; and when the result determined at the second determining step represents that the first record medium is an original record medium, advancing the copy generation information by one and controlling a recording operation for recording content data that is read the first record medium to a second record medium corresponding to the copy management information.

26. The recording method as set forth in claim 25, wherein a controlling step is performed by controlling the recording operation for the content data that is read from the first record medium and the management information that contains the copy generation information that has been advanced by one generation corresponding to the copy management information.

27. The recording method as set forth in claim 26, wherein the second determining step is performed by determining whether the first record medium is an original record medium corresponding to a result of the first determining step, the identification information, and the copy generation information.

28. The recording method as set forth in claim 26, wherein when a result determined result at the second determining step represents that the first record medium is not an original record medium, the controlling step is performed by advancing the copy generation information by one, wherein when the content data that is read from the first record medium is recorded to the second record medium, the controlling step is performed by advancing the copy generation information by one and performing the recording operation for recording the resultant copy generation information to the second record medium along with the content data that is read from the first record medium.

29. The recording method as set forth in claim 25, wherein the management information further contains charging information, and wherein when the content data that is read from the first record medium is recorded to the second record medium corresponding to the copy management information, a controlling step is performed by charging process corresponding to the charging information.

30. A reproducing method, comprising the steps of:

first determining a type of a record medium, a plurality of types of management information provided corresponding to a plurality of types of record medias being recorded to the record medium along with content data;

secondly determining whether the record medium is an original record medium corresponding to the management information that is read from the record medium and the type of the record medium determined at the first determining step; and when a result determined at the second determining step represents that the record medium is an original record medium, performing a reproducing operation for the record medium corresponding to the management information.

31. The reproducing method as set forth in claim 30, further comprising the step of:

when the result determined at the second determining step represents that the record medium is not an original record medium, prohibiting the record medium from being reproduced.

32. The reproducing method as set forth in claim 31, wherein the management information contains copy generation information, and wherein the reproducing method further comprises the step of:

when the result determined at the second determining step represents that the record medium is not an original record medium, advancing the copy generation information by one.

33. The reproducing method as set forth in claim 31, wherein the management information further contains charging information, and wherein the reproducing method further comprises the step of:

when the content data read from the record medium is reproduced corresponding to the charging information, performing a charging process corresponding to the charging information.

34. A recording and reproducing method, comprising the steps of:

first determining a type of a first record medium, wherein a plurality of management information corresponding to a plurality of types of record media is recorded on the first record medium, and wherein the plurality of types of management information include a copy generation information and copy management information;

secondly determining whether the first record medium is an original record medium corresponding to the management information that is read from the first record medium and the type of the record medium at the first determining step;

when a result determined at the second determining step represents that the first record medium is an original record medium, reproducing the first record medium corresponding to the management information; and advancing the copy generation information by one and controlling a recording operation for recording the content data that is read from the first record medium to a second record medium corresponding to the copy management information.

35. The recording and reproducing method as set forth in claim 34, wherein a controlling step is performed by controlling the recording operation for the content data that is read from the first record medium and the management information that contains the copy generation information that has been advanced by one generation corresponding to the copy management information.

36. The recording and reproducing method as set forth in claim 35, wherein the second determining step is performed by determining whether the first record medium is an original record medium corresponding to the first record medium determined at the first determining step, the identification information, and the copy generation information.

37. The recording and reproducing method as set forth in claim 34, further comprising the step of:

wherein when the result determined at the second determining step represents that the first record medium is not an original record medium, prohibiting the first record medium from being reproduced.

38. The recording and reproducing method as set forth in claim 34, wherein when the result determined at the second determining step represents that the first record medium is not an original record medium, the controlling step is performed by advancing the copy generation information by one and controlling the reproducing operation for the first record medium corresponding to the management information, wherein when the content data that is read from the first record medium is recorded to a second record medium, the controlling step is performed by advancing the copy generation information by one and controlling the recording operation for recording the content data read from the first record medium to the second record medium corresponding to the management information.

39. A recording and/or reproducing method, comprising the steps of:

first determining a type of a record medium, wherein the record medium has an identification portion used to identify the type thereof, management information contains at least identification information, the record medium has copy generation information, and the record medium has copy management information being recorded to the record medium along with content;

secondly determining whether the record medium is an original record medium corresponding to a result of identifying the record medium, at least the identification information, and the copy generation information that are read from the record medium; and controlling a recording operation and/or a reproducing operation for the record medium corresponding to a result determined at the second determining step.

40. The recording and/or reproducing method as set forth in claim 39, wherein when the result determined at the second determining step represents that the record medium is an original record medium, the controlling step is performed by controlling the reproducing operation for the record medium corresponding to the management information.

41. The recording and/or reproducing method as set forth in claim 39, wherein the record medium comprises a first record medium, and wherein when the result determined at the second determining step represents that the first record medium is an original record medium, the controlling step is performed by recording the content data that is read from the first record medium to a second record medium corresponding to the copy management information and the copy generation information, advancing the copy generation by one, and recording the content data and the resultant copy generation information to the second record medium.

42. The recording and/or reproducing method as set forth in claim 39, wherein when the result determined at the second determining step represents that the record medium is not an original record medium, the controlling step is performed by advancing the copy generation information that is read from the record medium by one generation.

43. The recording and/or reproducing method as set forth in claim 42, wherein the controlling step is performed by controlling the reproducing operation for the record medium corresponding to the management information.

44. The recording and/or reproducing method as set forth in claim 42, wherein the controlling step is performed by recording the content data that is read from the first record medium to the second record medium corresponding to the copy management information and the copy generation information, advancing the generation the copy generation information by one, and recording the content data and the copy generation information to the second record medium.

45. The recording and/or reproducing method as set forth in claim 39, when the result determined at the second determining step represents that the record medium is an original record medium, the controlling step is performed by prohibiting the record medium from being reproduced.

* * * * *

UNITED STATES PATENT AND TRADEMARK OFFICE
CERTIFICATE OF CORRECTION

PATENT NO. : 7,369,473 B2
APPLICATION NO. : 11/591161
DATED : May 6, 2008
INVENTOR(S) : Yoichiro Sako, Tatsuya Inokuchi and Shunsuke Furukawa It is certified that error appears in the above-identified patent and that said Letters Patent is hereby corrected as shown below:

On the Title Page Item -57- Abstract, last line, "encode process" should read --encoding process--;

Column 2, line 22, delete "that";

Column 4, line 34, "mediums" should read --medium--;

Column 22, line 6, "These copy" should read --The copy--;

Column 22, line 46, delete "when";

Column 32, line 1, delete "to a";

Column 32, line 2, delete "management condition selected corresponding";

Column 33, line 11, "close" should read --closed--;

Column 34, line 7, delete "to a";

Column 34, line 8, delete "management condition selected corresponding";

Column 34, line 29, delete "the";

Column 34, line 30, delete line 30;

Column 34, line 31, delete "sponding to";

Column 35, line 27, "step" should read --steps--;

Column 35, line 58, "read the" should read --read from the--;

Column 36, line 8, delete "result";

Column 36, line 27, "by charging" should read -- by a charging--;

UNITED STATES PATENT AND TRADEMARK OFFICE
CERTIFICATE OF CORRECTION

PATENT NO. : 7,369,473 B2
APPLICATION NO. : 11/591161
DATED : May 6, 2008
INVENTOR(S) : Yoichiro Sako, Tatsuya Inokuchi and Shunsuke Furukawa It is certified that error appears in the above-identified patent and that said Letters Patent is hereby corrected as shown below:

Column 36, line 32, "medias" should read --media--;

Column 37, line 7, delete "a";

Column 38, line 55, delete "the generation";

Column 38, line 62, "when the" should read --wherein when the--.

Signed and Sealed this

Fourth Day of August, 2009

JOHN DOLL
*Acting Director of the United States Patent and Trademark Office*